United States Patent [19]

Nii

[11] Patent Number: 5,698,955
[45] Date of Patent: Dec. 16, 1997

[54] METHOD OF CONTROLLING GENERATED POWER IN SERIES HYBRID VEHICLE

[75] Inventor: Yoshihide Nii, Fuji, Japan

[73] Assignee: Toyota Jidosha Kabushiki Kaisha, Aichi-ken, Japan

[21] Appl. No.: 510,497

[22] Filed: Aug. 2, 1995

[30] Foreign Application Priority Data

Sep. 1, 1994 [JP] Japan .................. 6-208444

[51] Int. Cl.$^6$ ...................................... H02P 1/00
[52] U.S. Cl. .................. 318/139; 318/254; 318/138; 318/439
[58] Field of Search ............... 318/139, 254, 318/138, 439; 364/551.01

[56] References Cited

U.S. PATENT DOCUMENTS

| | | | |
|---|---|---|---|
| 4,493,303 | 1/1985 | Thompson et al. | 364/551.01 X |
| 5,566,091 | 10/1996 | Schricker et al. | 364/551.01 X |

FOREIGN PATENT DOCUMENTS

| | | |
|---|---|---|
| 543 390 | 5/1993 | European Pat. Off. . |
| 41 33 014 | 4/1993 | Germany . |
| 48-2507 | 1/1973 | Japan . |
| 48-51419 | 7/1973 | Japan . |
| A-59-198802 | 11/1984 | Japan . |
| A-5-29085 | 2/1993 | Japan . |
| A-6-245320 | 9/1994 | Japan . |

*Primary Examiner*—Karen Masih
*Attorney, Agent, or Firm*—Oliff & Berridge

[57] ABSTRACT

A method of controlling a generated power in a series hybrid vehicle. From the tendency of an inverter input power or a motor dissipation power in a certain period is first estimated the tendency of the inverter input power or the motor dissipation power in the next period. The target power to be generated is then set on the basis of the results of the estimation. Alternatively the target power to be generated is corrected in accordance with the quantities such as an accelerator angle indicating the load of the motor or a battery current indicating the state of charge/discharge of the battery. Alternatively that period is compulsorily interrupted to start the next period. This will eliminate a delay arising from averaging the inverter input powers or the motor dissipation powers for use as the target power in the next period, thus resulting in improved vehicle power efficiency and drive feeling.

20 Claims, 25 Drawing Sheets

METHOD OF CONTROLLING GENERATED POWER IN SERIES HYBRID VEHICLE

BACKGROUND OF THE INVENTION a) Field of the Invention

The present invention relates generally to a series hybrid vehicle (SHV), i.e., an electric vehicle (EV) mounted with a battery and generator serving as components for supplying driving power to its driving motor, and more particularly to a method of controlling power generated by the generator mounted on the SHV.

b) Description of the Related Art

Some types of EV driving system configurations are known. Among them the system called SHV includes not only a battery but also a generator as components for supplying driving power to its driving motor. The generator is typically driven by the engine. The generated power of the generator can be used both for the driving of the driving motor and for the charging of the battery.

Similar to the battery mounted on a pure EV, the battery mounted on the SHV can be naturally charged with power supplied from the exterior of the vehicle (e.g., power from a charging stand) or with power regenerated from the driving motor. Compared with the pure EV, advantageously the SHV can suppress the frequency to charge the battery with the external power, and maintain the state of charge (SOC) of the battery within a predetermined range to thus prolong its life.

Differing from the existing vehicle engine, the engine of the SHV is not directly coupled with the driving wheels. This means that the rotation of the engine is independent of the rotation of the driving wheels in the SHV, in other words, the number of rotations or the throttle angle of the engine can be controlled irrespective of the state of the rotation of the driving wheels (the state of acceleration/deceleration of the vehicle velocity). For example, compared with the conventional one, the drive of the engine with wide open throttle (WOT) in the SHV ensures a drive of the engine with a better fuel efficiency and can reduce the emission of noxious components contained in the exhaust gas from the engine.

b1) Conventional SHV

FIG. 24 depicts by way of example a configuration of the SHV. As the driving motor this SHV employs a three-phase alternating current motor 10. The output shaft of the motor 10 is coupled via a differential gear 12, etc., with driving wheels 14. Also, as the driving power source for the motor 10, there are provided a battery 16 and a generator 18. The generator 18 is driven by the mechanical output of the engine 24 whose number of rotations is increased by a speed increasing mechanism 26. By interposing such a speed increasing mechanism 26 between the engine 24 and the generator 18, the generator 18 can be rotated at a higher speed than the engine 24, thus enabling the size of the generator 18 to be reduced.

The generator 18 is a three-phase alternating current generator whose generated power is rectified by a rectifier 22. In the powering state, the generated power rectified by the rectifier 22 is converted into a three-phase alternating current by an inverter 20 and is thereupon fed as the driving power into the motor 10. If at that time the generator 18 cannot independently supply the power required for the driving of the motor 10, the deficiency of the generated power relative to the required motor driving power is supplemented by the discharged power of the battery 16. Similar to the generated power of the generator 18, the discharged output of the battery 16 is converted into a three-phase alternating current by the inverter 20 and then supplied as the driving power into the motor 10. On the contrary, if a larger generated power than the required motor driving power is obtained, then the surplus of the generated power with respect to the required motor driving power is used to charge the battery 16. When the motor 10 is in a regeneration braking state, the regeneration power from the motor 10 is rectified by the inverter 20 and thereafter used to charge the battery 16.

The action of the motor 10 is controlled by the controller 28. Based on the accelerator angle $\theta_A$ indicating the acceleration demand from the driver, the controller 28 first determines a reference torque $T_{ref}$ for the motor 10. At that time the controller 28 refers to and monitors the number of rotations N detected by a number-of-rotation sensor 30. The controller 28 then generates switching signals (e.g., a pulse width modulation signal: PWM signal) in response to the thus determined reference torque $T_{ref}$. The controller 28 supplies the thus generated switching signals to switching devices constituting the inverter 20. Through the series of procedures, the acceleration in accordance with the torque corresponding to the reference torque $T_{ref}$ that is, with the accelerator angle $\theta_A$, can be realized.

The SHV requires that the fuel efficiency of the engine 24 be optimized and the emission from the engine 24 be minimized. Since frequent or sharp changes in the number of rotations of the engine 24 increase emissions from the engine 24, the generated power from the generator 18 must be constant in order to minimize emissions from the engine 24. However with the generated power of the generator 18 constant, the charging and discharging of the battery 16 may become unbalanced. For example, when the generated power is constant and the motor 10 continues to be driven with a large output over a long period of time, the charge/discharge balance may rapidly slant to the discharge side and therefore the SOC of the battery 16 is reduced since the state lasts for a long period of time in which the power required for the driving of the motor 10 is not to be supplied solely from the generator 18. The opposite will also happen if the motor continues to be driven at a low output for a long period of time. Accordingly, if the generated power of the generator 18 is made constant, the SOC is inevitably subject to a variation over a wide range. Since the life of the battery 16 is prolonged as long as the SOC is controlled to lie within a relatively smaller and predetermined range, a constant generated power of the generator 18 will shorten the life of the battery 16.

To relieve this problem, it is preferred to introduce the target control for the generated power of the generator 18, with the restriction of the variation of the target power to be generated of the generator 18 so as not to cause frequent and sharp changes in the number of rotations of the engine 24. For example, the high-speed target power and low-speed target power are prepared as the target power to be generated. When the number of rotations N of the motor 10 detected by the rotation sensor 30 equals or exceeds a predetermined value, use is made of the high-speed target power, whereas with less than the predetermined value the low-speed target power is used. The number of rotations of the engine 24 and the generated power of the generator 18 can be controlled by regulating the throttle angle $\theta_{th}$ of the engine 24 and the field current $I_f$ of the generator 18. This high/low switching will allow the reduced change in the SOC caused by the change of the motor output than that in the constant power driving of the generator 18.

b2) Improvement Already Proposed by the Applicant

However a mere switching the target power in accordance with the number of the rotations of the motor 10 would allow the number of rotations of the engine 24 to be subjected to a frequent or abrupt change e.g., when acceleration and deceleration are frequently repeated. The present applicant has already proposed, in 1993, a method complying with the principle shown in FIG. 25 as a method capable of solving these problems (Japanese Patent Application No. Hei 5-29085).

This principle includes that an inverter input power= motor output power/inverter efficiency, which is averaged in a certain averaging period, and the resultant average is used as the target of the generated power (target power to be generated) of the generator 18 in the next averaging period. For example, the averaged inverter input power in the averaging period B is used as the target power in the next averaging period C, and the averaged inverter input power in the averaging period C is used as the target power in the next averaging period D. In this manner, the target power to be generated is updated in accordance with the averaged inverter input power and for each averaging period.

To realize this principle, the charge/discharge balance of the battery 16 must be appropriately monitored. To this end, the controller 28 selectively monitors a motor voltage $V_M$ detected by a voltage sensor 32, a motor current $I_M$ detected by a current sensor 34, an inverter input current $I_{INV}$ detected by a current sensor 36, a battery voltage $V_B$ detected by a voltage sensor 38, a battery current $I_B$ detected by a current sensor 40, etc. On the basis of these detected values, the controller 28 calculates the generated power of the generator 18, input/output power into and from the inverter 20, and the charged/discharged power of the battery 16 for each averaging period. From these results, the controller 28 evaluates the balance of charge/discharge of the battery 16. By simultaneously calculating the accumulated value of the charge/ discharge current of the battery 16 and using the initial value of the SOC, the SOC of the battery 16 can be monitored. In response to these power balance and SOC values, the controller 28 controls the number of rotations of the engine 24 and the generated power of the generator 18.

According to such a principle, the variation of the motor output power can be rapidly followed by the generated power of the generator 18 and hence the charge/discharge of the battery 16 can be suppressed compared with the control making the generated power constant or with the control switching the target power in compliance with the high-speed or low-speed, whereby the SOC of the battery 16 can be maintained at all times within the range of the target and hence the life can be prolonged. Due to the total lack of any possibility to cause a variation in the number of rotations of the engine 24 in a shorter period than the averaging period, the emission is prevented from remarkable increasing.

b3) Problems which Have Newly Arisen

Disadvantageously, the control by such principle entails a control delay on account of the averaging operation. More specifically, since the average inverter input power in a certain averaging period is used as the target power to be generated in the next averaging period, the change of the generated power is slightly delayed with respect to the change of the inverter input power, as shown in FIG. 25.

This delay firstly will confer a sense of incongruity on the driver in view of the drive feeling. Take as an example a case where the driver has depressed the accelerator pedal and thereupon has immediately released the accelerator pedal. In this case, a torque is imparted to the motor 10 in accordance with the depressing of the accelerator pedal, with the result that the inverter input power is increased. When the inverter input power is increased in a certain averaging period, the target power in the next averaging period is changed into a larger value than the target power in that averaging period. If the driver has already released the accelerator pedal before entering that next averaging period, the number of rotations of the engine 24 is increased irrespective of the fact that there is no depressing of the accelerator pedal by the driver. Although the increase in the number of rotations of the engine 24 will not cause any danger with regard to the driving of the vehicle, since in the SHV the engine 24 is not directly coupled with the driving wheels 14, this phenomenon, which was never experienced in the existing vehicle having only the engine, may impart a sense of incongruity to the driver accustomed to the existing vehicle.

The delay of the change in the generated power with respect to the change in the inverter input power will secondly be an obstacle to the improvement of the power efficiency. For example, the battery 16 is forced to discharge in the averaging period (e.g., averaging period B) in which the inverter input power exceeds the generated power. Conversely, the battery is charged by the generated power in the averaging period (e.g., averaging period D) in which the inverter input power is less than the generated power. At the time of these charge/discharge, a loss will occur due to the charge/discharge efficiency of the battery 16, and therefore the power efficiency lowers when estimated for the overall vehicle.

Incidentally by setting the target power to be generated on the basis of the moving average of the inverter input power, the above delay can be diminished. That is, this technique will enable the delay of change in the generated power with respect to the change in the inverter input power to be reduced to a degree of ½ of the moving averaging period. Simultaneously it is possible to remove the high-frequency fluctuation contained in the inverter input power from the target power to be generated, namely, to prevent the high-frequency fluctuation from occurring in the number of rotations of the engine 24. However, the setting of the target power on the basis of the moving average will cause a problem that the target power always varies in accordance with the variation of the inverter input power. It will be appreciated that the target power becomes constant within at least a single averaging period in the foregoing method in which the average inverter input power in a certain averaging period is used as the target power in the next averaging period. In other words, the method of setting the target power on the basis of the moving average is liable to cause deterioration of the emission or fuel efficiency arising from the change in the number of rotations of the engine 24.

SUMMARY OF THE INVENTION

It is therefore the first object of the present invention to avoid or alleviate delays in control due to averaging operations, by setting or modifying target powers to be generated, on the basis of a motor output power, the state of load of a battery, etc., thus improving the drive feeling and power efficiency. The second object of the present invention lies in realizing a more accurate, simple and rapid control of a generated power as well as a control adaptable to variations of the motor output power.

The present invention is applied to a series hybrid vehicle (SHV) equipped with an engine, a generator, a battery, and a motor, the generator driven by the engine, the motor driven by the generated power of the generator and a discharged power of the battery, the battery being charged by the generated power. According to an aspect of the present invention, there is provided a method executed in the SHV and comprising the first step of controlling, for each of successively coming periods, the generated power in accordance with a target power to be generated; the second step of detecting, while controlling the generated power, a plurality of times in a single period, a prediction base quantity implying both an instantaneous motor output of the motor and the tendency of the instantaneous motor output; and the third step of determining, on the basis of the prediction base quantity, the target power to be generated in coming periods.

Thus in the present invention, the tendency of the instantaneous motor output in a certain period is reflected on the target to be generated in the subsequent period, whereupon in that subsequent period the difference between the actual generated power and the instantaneous motor output will diminish compared with the prior art. This is equivalent to a reduction of delays in control which have been hitherto often caused by the averaging operations. Accordingly the present invention is capable of realizing an improvement in the drive feeling and power efficiency.

The first example of the prediction base quantity can be an approximation function approximating variations in the instantaneous motor output power. When using such a prediction base quantity, in the third step there is first estimated an expectation of an average motor output power in a coming period or periods by use of the approximation function determined for the periods which have already elapsed. The expectation may be estimated by, e.g., substituting for the above approximation function a point of time lying in the middle of each of the coming periods. Then, on the basis of the thus estimated expectation, the target power to be generated in the corresponding one of coming periods is determined.

In particular the use of the method of least-squares approximation for the derivation of the approximation function would heighten the accuracy with which the expectation is estimated, thus lessening the control error in those coming periods. Also realized are a simplified estimating operation and a rapid control in the case of using, as the above approximation function, a function joining the instantaneous motor output powers at a plurality of (e.g., two) points of time lying within the period which has already elapsed. The two points to be employed in this case can be the start timing and the end timing of the period which has already elapsed. A linear function may be an approximation function of the simplest type and hence allowing the simplest estimating operation.

The second example of the prediction base quantity can be the first index value indicating the status of acceleration/deceleration, i.e., the state of positive/negative acceleration of the motor at the most recent point of time. When using such a prediction base quantity, preferred procedures employable in the third step may include firstly a procedure for modifying the target power to be generated and secondly a procedure for interrupting the control period.

With the adoption of the procedure for modifying the target power to be generated, in the third step the instantaneous motor output powers are first averaged for each period to detect the average motor output power. Then the quantity obtained by subjecting the average motor output power in the period which has already elapsed to a modification in accordance with the first index value is set as the target power to be generated in a coming period or periods. For example if the instantaneous motor output power or the required motor output power has an increasing tendency in the vicinity of the transition from a certain period to the next period, the target power to be generated in that next period will be modified upward with respect to the motor average output power, whereas if it has a decreasing tendency, it is modified downward. In this manner the modification of the target power can be carried out.

The first way of modifying the target power to be generated upon the setting of the generated power in the next period is to utilize the results of comparison between the output zone, within which lies the average motor output power in the period which has already elapsed, and the positive/negative acceleration zone, within which lies the state of the positive/negative acceleration at a recent period of time. This method will allow the contents of the modifications to be determined in accordance with combinations of the output zone, within which lies the average motor output power in the period which has already elapsed, and the positive/negative acceleration zone, within which lies the state of the positive/negative acceleration at a recent period of time. More specifically the target power to be generated is modified into a larger value than that before modification when that output zone is one indicating a small output and that positive/negative acceleration zone is one indicating a high acceleration, whereas the target power is modified into smaller value than that before modification when that output zone is one indicating a large output and that positive/negative acceleration zone is one indicating a low acceleration. This method will also enable the target power after the modification to be fixed to a constant which is predetermined by e.g., the ratio relative to the permitted maximum generated power of the generator, for each of the combinations of the zones, thus contributing to the realization of a stable control preventing an occurrence of superposed noise.

The second method of modifying the target power to be generated upon the setting of the generated power in the next period is to modify the target power in accordance with the amount of variations relative to the first index value indicating the positive/negative acceleration of the motor at the most recent point of time, of the second index value indicating the state of average positive/negative acceleration of the motor in that period which has elapsed. This method will ensure a simplified control operation and accurate control.

In the case of using the first index value as the prediction base quantity and of employing the procedure to interrupt the control period, it is first detected, in the third step and on the basis of the second index value, that the first index value has changed by a predetermined degree or more. It is to be noted that the second index value herein is a quantity indicating the state of the average positive/negative acceleration of the motor during a preceding predetermined period of time, which differs slightly from the foregoing in meaning. Afterwards if the first index value has changed by the predetermined degree or more, the period just about to elapse is forcibly interrupted and a new period is forcibly started. Then, the instantaneous motor output powers are averaged for each period to detect the average motor output power in that period. Thereafter at the point of time when the new period has been started, the average motor output power in the periods which have already elapsed is set as the target power to be generated in that new period.

The adoption of such a procedure eliminates the need to allow for an abrupt change in the instantaneous motor output power or the required motor output power upon designing the control period (averaging period), which will contribute to a longer averaging period for the instantaneous motor output power than in the prior art. The longer averaging period will lead to an extension of the period of time during which the engine speed is constant, resulting in an improvement in the fuel efficiency and emission. It is to be appreciated that depending on the nature of the first index value, the first index values may be averaged for each period to thereby determine the second index values in the next period.

The third example of the prediction base quantity can be the third index value indicating the state of charge/discharge of the battery at the recent point of time. For the use of such a prediction base quantity, it is detected in the third step, on the basis of the fourth index value, that the third index value has changed by a predetermined degree or more. The fourth index value is a quantity indicating the average state of charge/discharge of the battery during a preceding predetermined period of time. Then, if the third index value has changed by the predetermined degree or more, the period just about to elapse is forcibly interrupted and a new period is forcibly started. Furthermore the instantaneous motor output powers are averaged for each period to thereby detect the average motor output power in that period. Then, at the point of time when a new period has been started, the average motor output power in the periods which have already elapsed is set as the target power to be generated in that new period.

The adoption of such a prediction base quantity enables the control period to be altered in response to an abrupt change in the state of load of the battery, thus eliminating the necessity of allowing for the abrupt change in the state of load of the battery upon designing the averaging period for the instantaneous motor output power. As a result of this, the averaging period of time for the instantaneous motor output power can be made longer than in the prior art, contributing to the improvement in the fuel efficiency and emission.

Additionally, the instantaneous motor output power may be detected on the basis of the current flowing through the motor and the voltage applied to the motor. In this case there is no need to use the quantity which has not been hitherto used for the control of generated power, resulting in less alteration in the conventional control procedure and apparatus. The same advantages can also be obtained by the detection on the basis of the discharged current of the battery and the voltage of the battery. When the instantaneous motor output power is detected on the basis of the motor output torque (including the accelerator angle, reference torque, etc.) and the number of rotations of the motor, the inertia of the motor will serve to smooth the number of rotations of the motor, and hence a stabler control is realized. It is natural that the same functions can be obtained by subjecting the detected values to the moving averaging operation even if the instantaneous motor output power is detected by use of quantities other than these.

The examples of the first index value are:
- a) the instantaneous motor output at the most recent point of time or its moving average;
- b) the number of rotation of the motor at the most recent point of time or its moving average;
- c) the speed of the series hybrid vehicle at the most recent point of time or its moving average;
- d) the torque required for the motor at the most recent point of time or its moving average; and
- e) the amount of depressing the accelerator pedal at the most recent point of time or its moving average.

The examples of the second index value are:
- a) average output of the motor in the period which has already elapsed; p1 b) the average number of rotation of the motor in the period which has already elapsed;
- c) the average speed of the series hybrid vehicle in the period which has already elapsed;
- d) the average torque required for the motor in the period which has already elapsed; and
- e) the average amount of depressing the accelerator pedal in the period which has already elapsed.

The examples of the third index value are;
- a) the discharged current of the battery at the most recent point of time or its moving average;
- b) the integrated value of the discharged current of the battery in the period which is just about to elapse; and
- c) the state of charge of the battery at the most recent point of time.

The examples of the fourth index value are:
- a) 0; and
- b) the state of charge of the battery at the earliest point of time after the end of the period which has already elapsed.

BRIEF DESCRIPTION OF THE DRAWINGS

These and other objects, advantages and features of the present invention will become more apparent from the following detailed description when taken in conjunction with the accompanying drawings, in which.

DETAILED DESCRIPTION OF THE PREFERRED EMBODIMENTS

Figure 1:
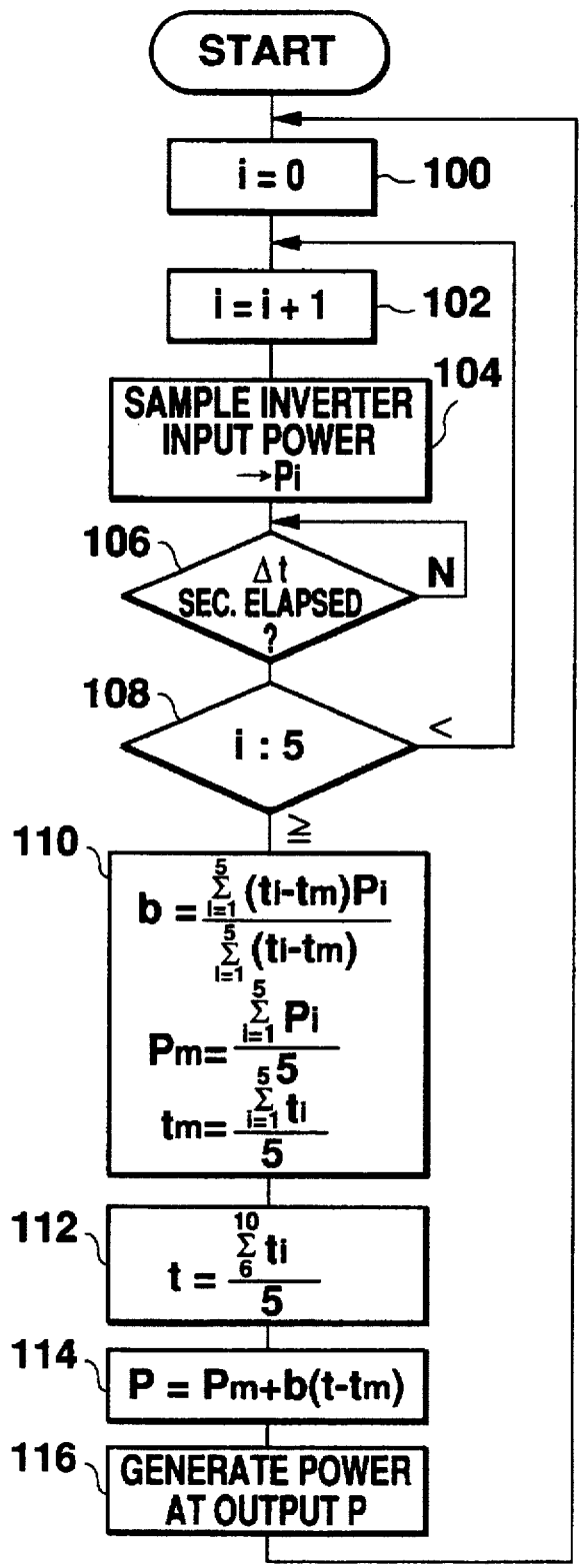
FIG. 1 is a flowchart showing a method of controlling the generated power in accordance with the first embodiment of the present invention.
Figure 24:
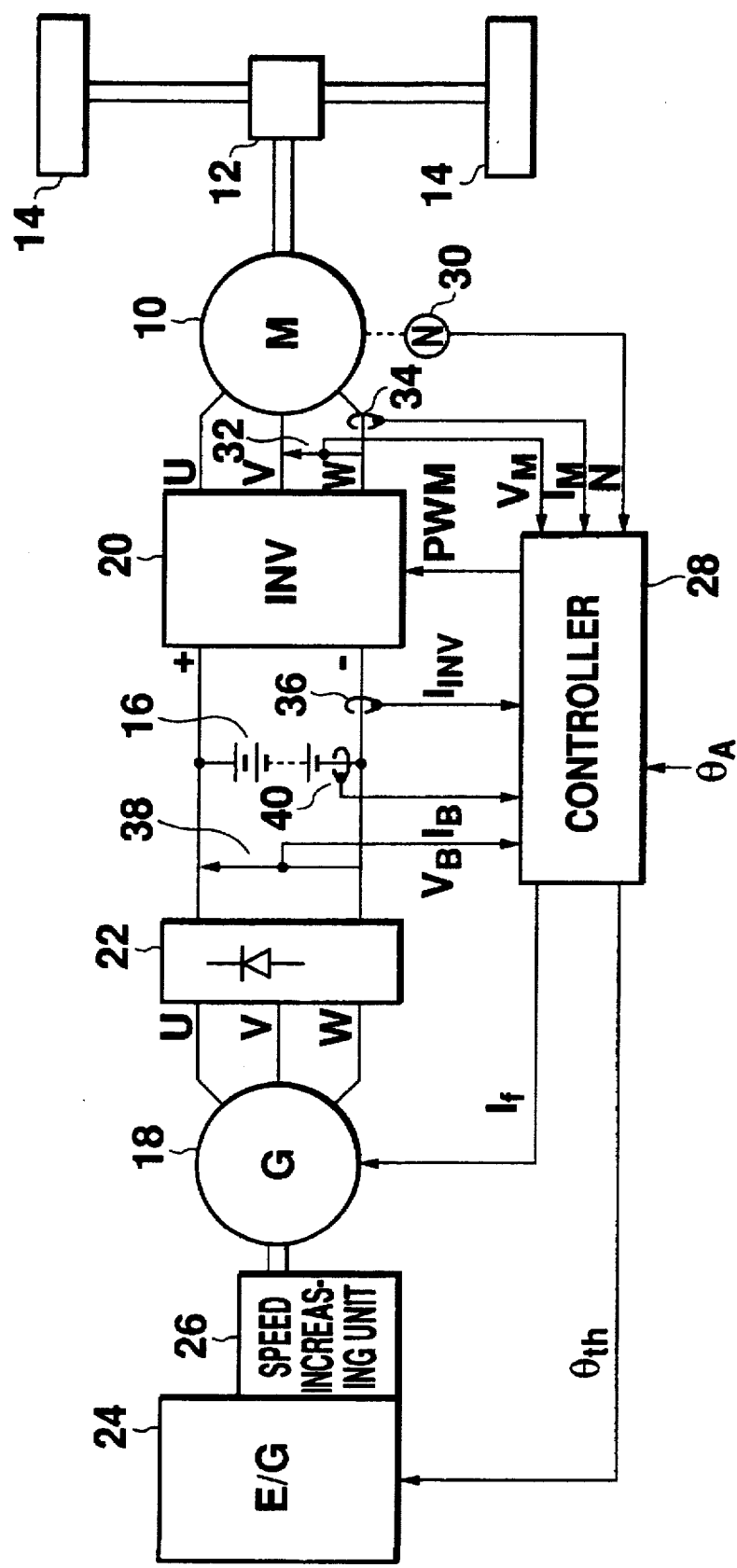
FIG. 24 is a block diagram showing, by way of example, a configuration of the SHV.
Figure 25:
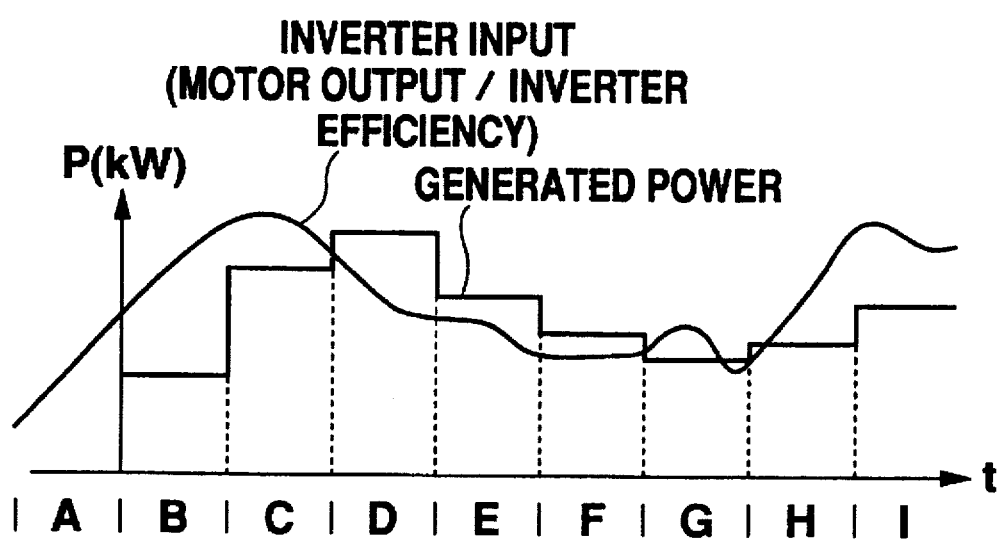
FIG. 25 is a timing chart showing the principle of a method of controlling the generated power in accordance with a prior art example.

Preferred exemplary embodiments of the present invention will now be described with reference to the accompanying drawings. It is to be appreciated that the present invention can be carried out under the configuration depicted in FIG. 24 and therefore the following description is given on the basis of the configuration of FIG. 24, but the present invention is not intended to be limited to the FIG. 24 configuration.

a) Estimate of Inverter Input Power (Motor Output Power) in Next Period a1) First Embodiment Referring to FIG. 1 there is depicted a flow of procedures for controlling the generated power among the procedures performed by a controller 28 in the first embodiment of the present invention.

In this embodiment the controller 28 first resets a variable i to 0 (100) and samples an instantaneous inverter input power $P_i$ five times (102, 104, 108). The sampling period is $\Delta t$ (106). By use of the least squares method the controller 28 approximates to a line L depicted in FIG. 2, which is the instantaneous inverter input power $P_i$ for five timing intervals obtained by the sampling (110). In other words, using the following expression (1), a "t" intercept ($t_m$, $P_m$) and a gradient b of the line L are calculated. Here among the variables representing the "t" intercept, $t_m$ is an average (an average sampling timing) of sampling timings $t_i$, and $P_m$ is an average (an average inverter input power) of the instantaneous inverter input powers $P_i$ sampled at the sampling timing $t_i$.

$$\left. \begin{array}{l} b = \dfrac{\sum\limits_{i=1}^{5}(t_i - t_m)P_i}{\sum\limits_{i=1}^{5}(t_i - t_m)} \\ P_m = \dfrac{1}{5}\sum\limits_{i=1}^{5} P_i \\ t_m = \dfrac{1}{5}\sum\limits_{i=1}^{5} t_i \end{array} \right\} \quad (1)$$

Figure 2:
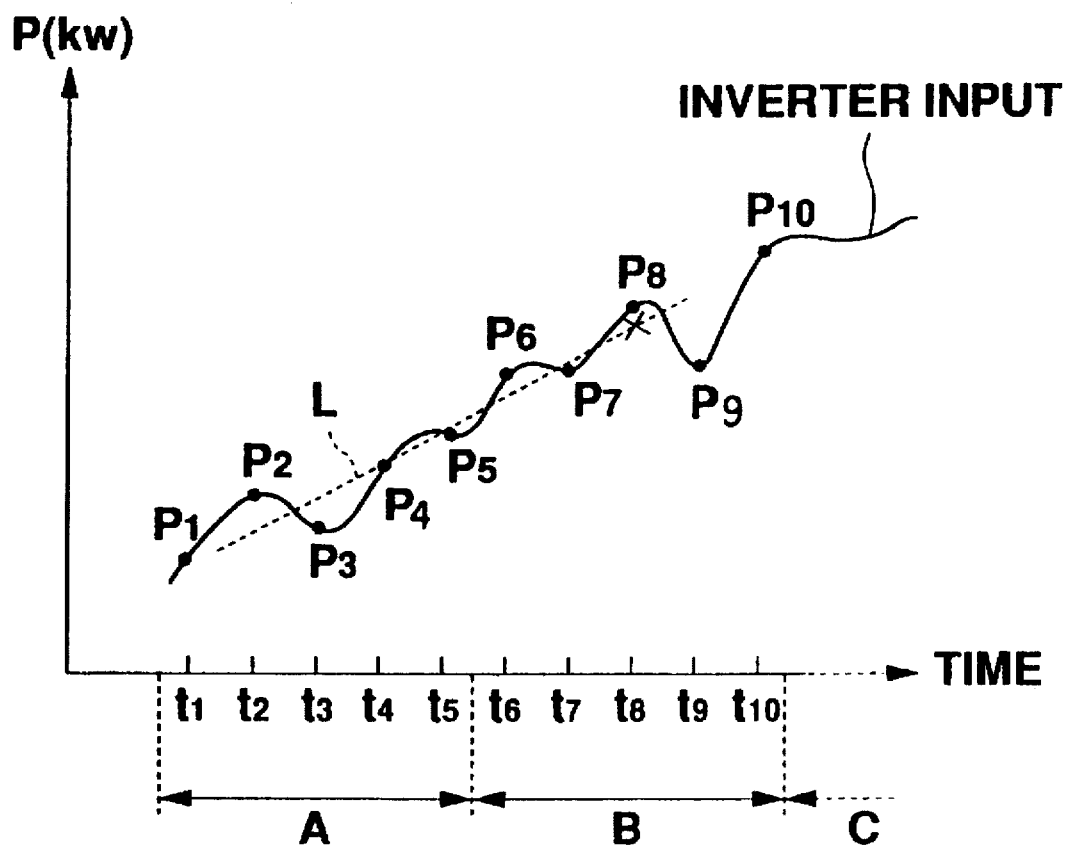
FIG. 2 is a timing chart showing the principle of the first embodiment.

The line L thus obtained is a line approximating variations with time of the instantaneous inverter input power P for an averaging period A depicted in FIG. 2. In this embodiment the line A approximating the inverter input for period A is used as a line indicating the target power for period B. That is, use is made of the line L in order to indicate the target power to be generated in the next averaging period B. Incidentally in this embodiment five timings are used for approximating the instantaneous inverter input power $P_i$. Thus in the following description, $t_1$ to $t_5$ represent five sampling timings falling within the averaging period A and $t_6$ to $t_{10}$ represent sampling timings falling within the averaging period B.

More specifically, from the following expression (2) the controller 28 first finds an average of the sampling timings $t_6$ to $t_{10}$, namely a timing t for which the expectation is to be estimated (112). Then the controller 28 substitutes, for the expression (3) defining the line L, both the timing t for which the expectation is to be estimated and "t" intercept ($t_m$, $P_m$) (114). P derived from this arithmetic operation represents an expectation of the inverter input power at the central timing $t_B$ in the period B. As the expectation P the controller 28 sets the target power to be generated in the period B and controls the generator 18 on the basis of the target power (116). Thereafter the action of the controller 28 returns to the step 100.

$$t = \dfrac{1}{5}\sum_{i=6}^{10} t_i \quad (2)$$

$$P = P_m + b(t - t_m) \quad (3)$$

Figure 3:
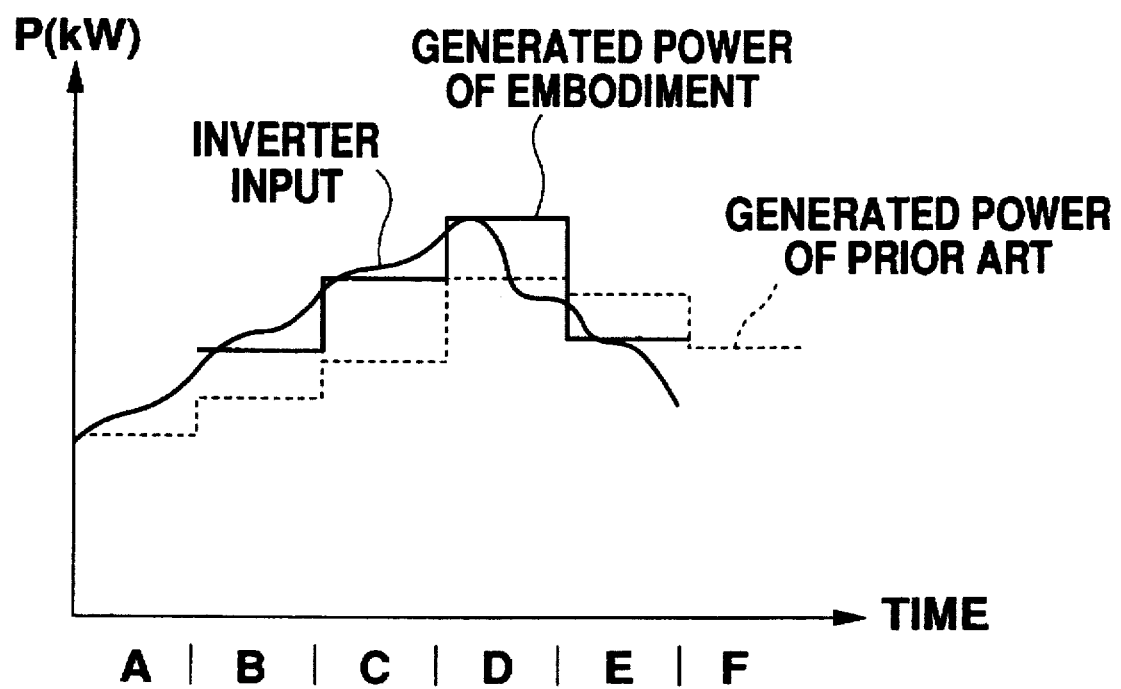
FIG. 3 is a timing chart showing the effects of the first embodiment through the comparison with the prior art.

Thus in this embodiment the tendency of the inverter input power is reflected in the target power to be generated. Accordingly, as shown in FIG. 3, this embodiment has less difference between the inverter input power and the generated power compared with the control method in which the average inverter input power $P_m$ in the previous averaging period is set as the target power. In other words, its ability to set the target power with less errors will prevent the charging and discharging of a battery 16 from occurring and reduce the amount of charged and discharged currents. This will result in advantages that variations of SOC of the battery 16 are suppressed to prolong its life and that the decrease in the power efficiency on an overall vehicle basis arising from the charge and discharge loss is prevented.

Furthermore, since the engine speed is constant in a single averaging period, hardly any variations occur in the engine speed and their attendant deteriorations in both the fuel efficiency and the emission, compared with the control method in which set as the target power is a moving average of the instantaneous inverter input power $P_i$.

Additionally, due to the fact that the line approximating the inverter input for period A is determined by use of the least squares approximation, it is possible to accurately estimate the expectation of the inverter input power at the timing $t_B$, which will contribute to accurate control of the power to be generated.

a2) Second Embodiment

Figure 4:
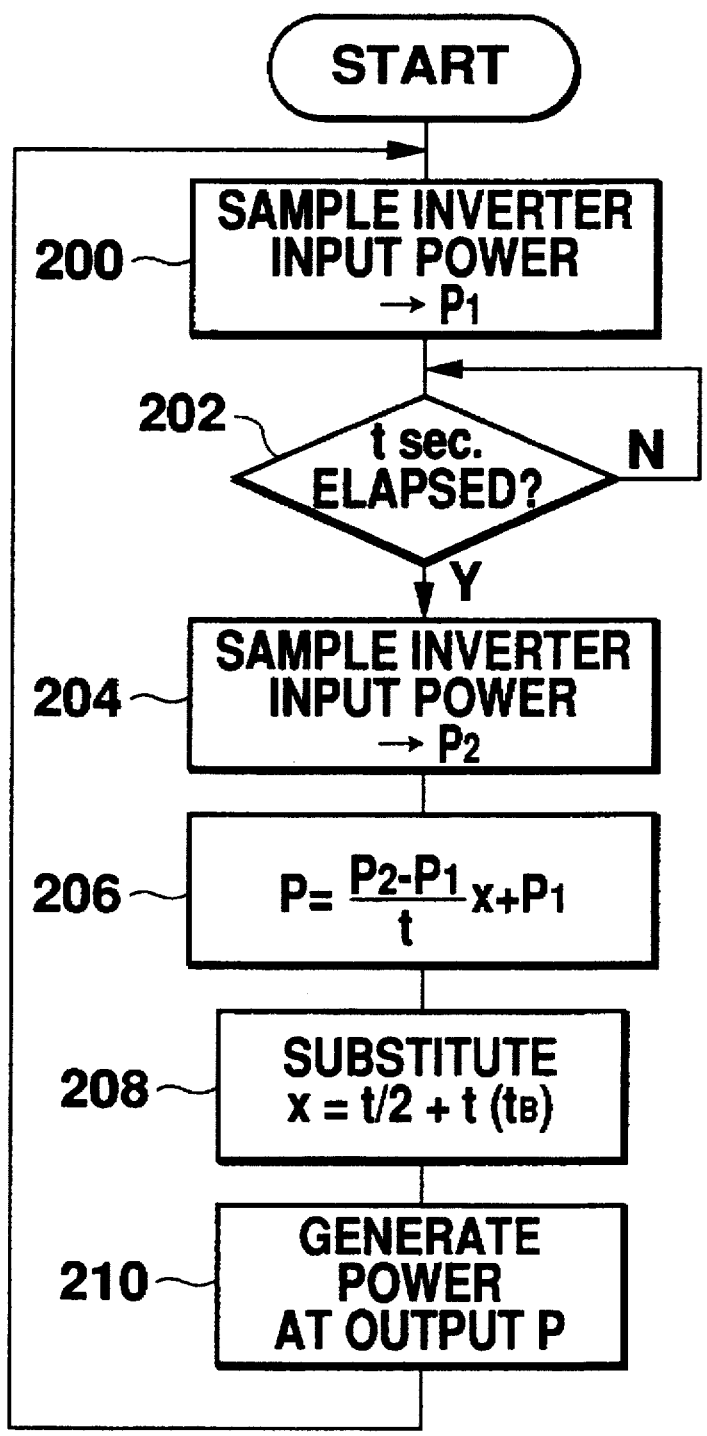
FIG. 4 is a flowchart showing a method of controlling the generated power in accordance with the second embodiment of the present invention.

Referring to FIG. 4 there is depicted a flow of actions which the controller 28 executes for controlling the generated power in the second embodiment of the present invention. In this embodiment the controller 28 samples the instantaneous inverter input power $P_i$ at both the start timing and the end timing of the respective averaging periods, each having a duration t (200 to 204). In the diagram, $P_1$ and $P_2$ represent sampled values at the start timing and the end timing, respectively, of the averaging period. By use of the thus obtained two sampled values $P_1$ and $P_2$, the controller 28 determines an approximating line L depicted in FIG. 5 (206). More specifically, for respective periods A, B, ..., the controller 28 finds the inverter input power $P_1$ at the start timing and the inverter input power $P_2$ at the end timing to thereby determine the following expression representing the line L joining $P_1$ and $P_2$.

$$P = (P_2 - P_1)/t^* \ast + P_1 \quad (4)$$

Figure 5:
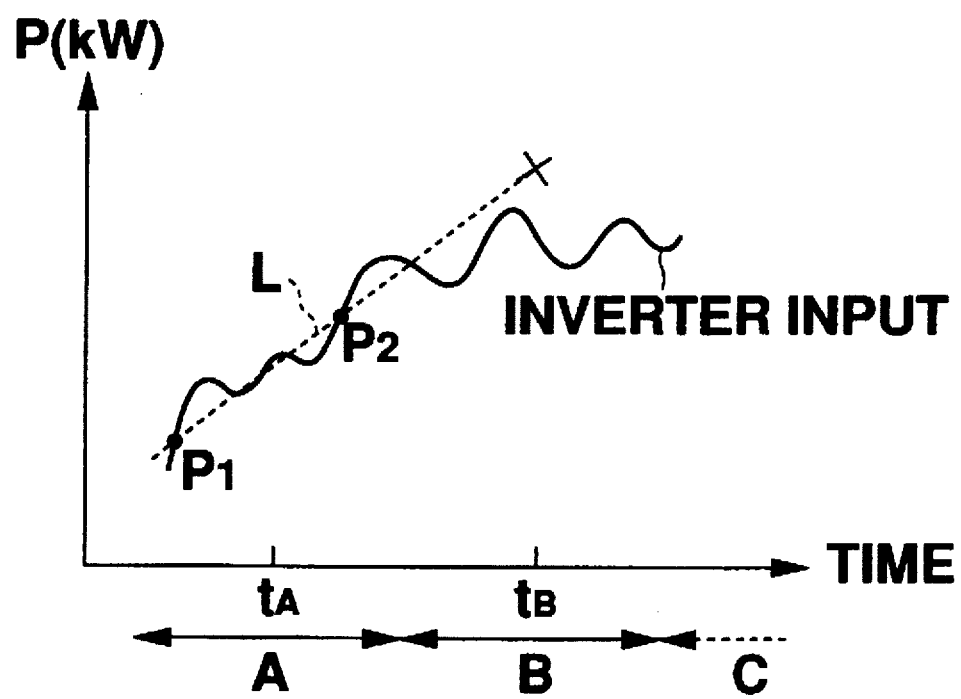
FIG. 5 is a timing chart showing the principle of the second embodiment.

For the thus determined expression (4) the controller 28 substitutes a central timing $t/2 + t$ in the next period B designated at $t_B$ in FIG. 5 (208). The resultant expected inverter input power P is used as the target to control the generated power of the generator 18 in the period B (210).

This will contribute to the realization of substantially the same effects as the first embodiment by this embodiment. It is to be particularly understood that the errors in generated power control may be slightly increased due to the lower approximation accuracy compared with the least squares approximation in the first embodiment. On the contrary, this embodiment will realize a speedup of the control due to a lower number of operations and allow a provision of additional functions by making use of the reduction in the load imposed on the controller 28.

b) Modification of Target Power by Zone Comparisons b1) Third Embodiment

Figure 6:
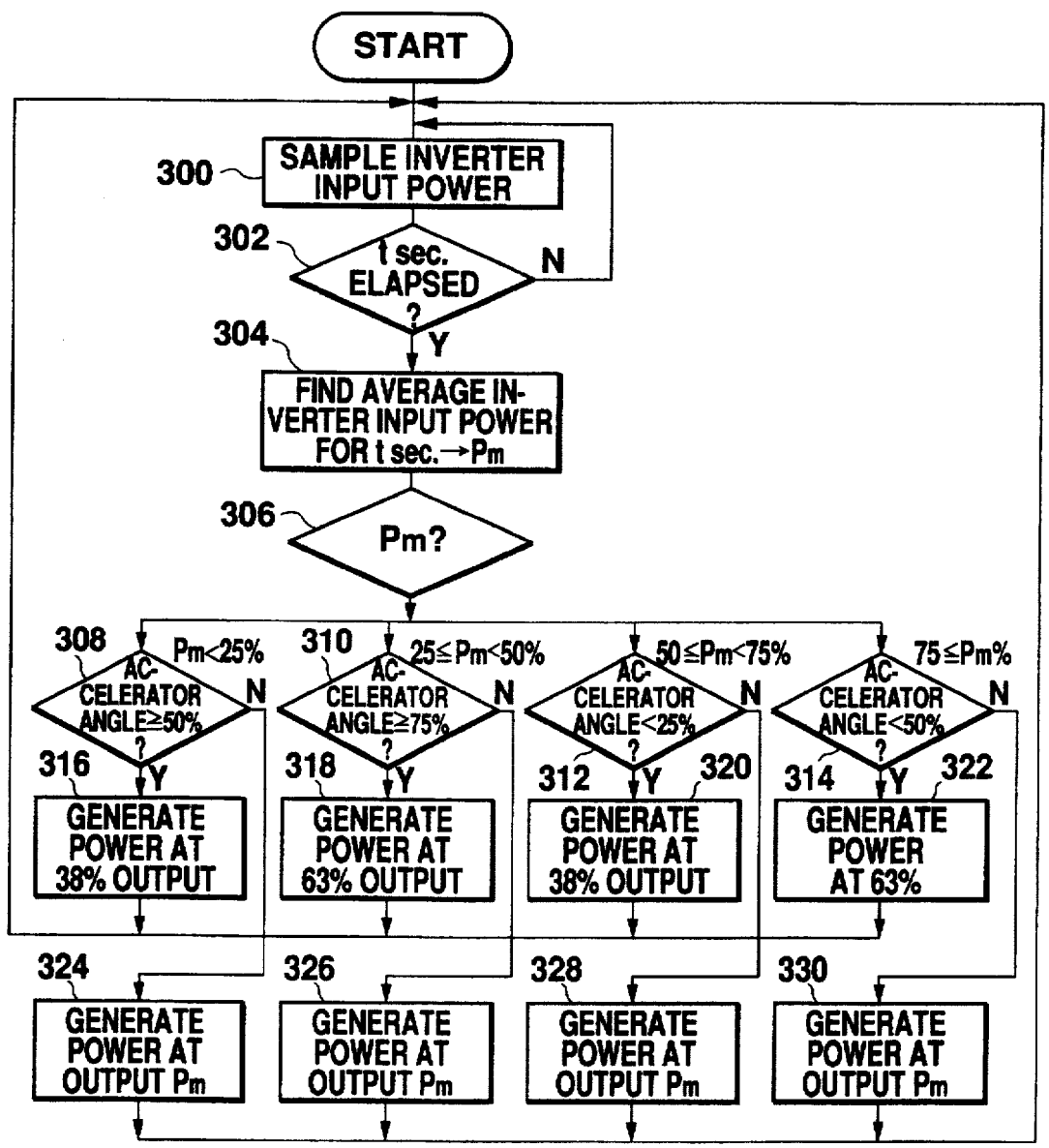
FIG. 6 is a flowchart showing a method of controlling the generated power in accordance with the third embodiment of the present invention.

Referring to FIG. 6 there is depicted a flow of actions which the controller 28 executes for controlling the generated power in the third embodiment of the present invention. In this embodiment, the controller 28 samples the instantaneous inverter input power $P_i$ a plurality of times during the respective averaging periods having a duration t (300, 302), and using the results finds the average $P_m$ of the sampled value $P_i$ in the averaging period (304). Unless the thus found average inverter input power $P_m$ and the accelerator angle $\theta_A$ at that point of time satisfy the predetermined conditions (306 to 314), in the same manner as the prior art techniques, the controller 28 uses the average inverter input power $P_m$ as the target for controlling the generated power of the generator 18 in the next averaging period (324 to 330).

This embodiment is characterized in that the target power to be generated is accordingly increased or decreased when the combination of the zone within which the average inverter input power $P_m$ falls and the zone within which the accelerator angle $\theta_A$ falls at the end of each averaging period results in a predetermined combination.

Referring now to Table 1, consider a case, by way of example, where the average inverter input power $P_m$ is less than 20% of the permitted maximum generated power of the generator 18 (306). In this case, if the accelerator angle $\theta_A$ is not less than 50% at the end of the averaging period (308), the instantaneous inverter input power $P_i$ in the next averaging period can be estimated to increase compared to before. Thus the controller 28 corrects the target power to increase it up to 38% of the permitted maximum generated power (316). In the same manner, if the average inverter input power $P_m$ is 25% or over and less than 50% of the permitted maximum generated power of the generator 18 (306), with the accelerator angle $\theta_A$ of 75% or over at the end of the averaging period (310), then the controller 28 will correct the target power to increase it up to 63% of the permitted maximum generated power (318). In both cases, the target power exceeds the average inverter input power $P_m$ (the hatched area in the lower right region of Table 1).

Conversely consideration will be given of a case where the average inverter input power $P_m$ is 50% or over and less than 75% of the permitted maximum generated power of the generator 18 (306). In this case if the accelerator angle $\theta_A$ is less than 25% at the end of the averaging period (312), the instantaneous inverter input power $P_i$ in the next averaging period is expected to decrease compared to before. Then the controller 28 corrects the target power to decrease it down to 38% of the permitted maximum generated power (320). Similarly, providing that the average inverter input power $P_m$ is more than 75% of the permitted maximum generated power of the generator 18 (306) with the accelerator angle $\theta_A$ less than 50% at the end of the averaging period, the controller 28 corrects the target power to decrease it down to 63% of the permitted maximum generated power (322). In both cases the target power is less than the average inverter input $P_m$ (the hatched area in the upper left region of Table 1).

TABLE 1

ZONE CORRECTION IN THIRD EMBODIMENT

| $P_m$ | $\theta_A$ | | | |
|---|---|---|---|---|
| | 0–25% | 25–50% | 50–75% | 75–100% |
| 75–100% | 63% | 63% | $P_m$ | $P_m$ |
| 50–75% | 38% | $P_m$ | $P_m$ | $P_m$ |
| 25–50% | $P_m$ | $P_m$ | $P_m$ | 63% |
| 0–25% | $P_m$ | $P_m$ | 38% | 38% |

/// TARGET POWER < $P_m$

\\\ TARGET POWER > $P_m$ $\theta_A$: ACCELERATOR ANGLE

In the third embodiment in this manner, the target power to be generated is set greater than the average inverter input power $P_m$ and in accordance with the average inverter input power $P_m$ and the accelerator angle $\theta_A$ when the zone within which the average inverter input power $P_m$ falls is a zone indicating "motor output power is small" and the zone within which the accelerator angle $\theta_A$ falls is a zone indicating "significant acceleration requirement is present". On the contrary, the target power to be generated is set smaller than the average inverter input power $P_m$ and in accordance with the average inverter input power $P_m$ and the accelerator angle $\theta_A$ providing that the zone within which the average inverter input power $P_m$ lies is a zone indicating "motor output power is large" and the zone within which the accelerator angle $\theta_A$ lies is a zone indicating "significant acceleration requirement is absent".

Figure 7:
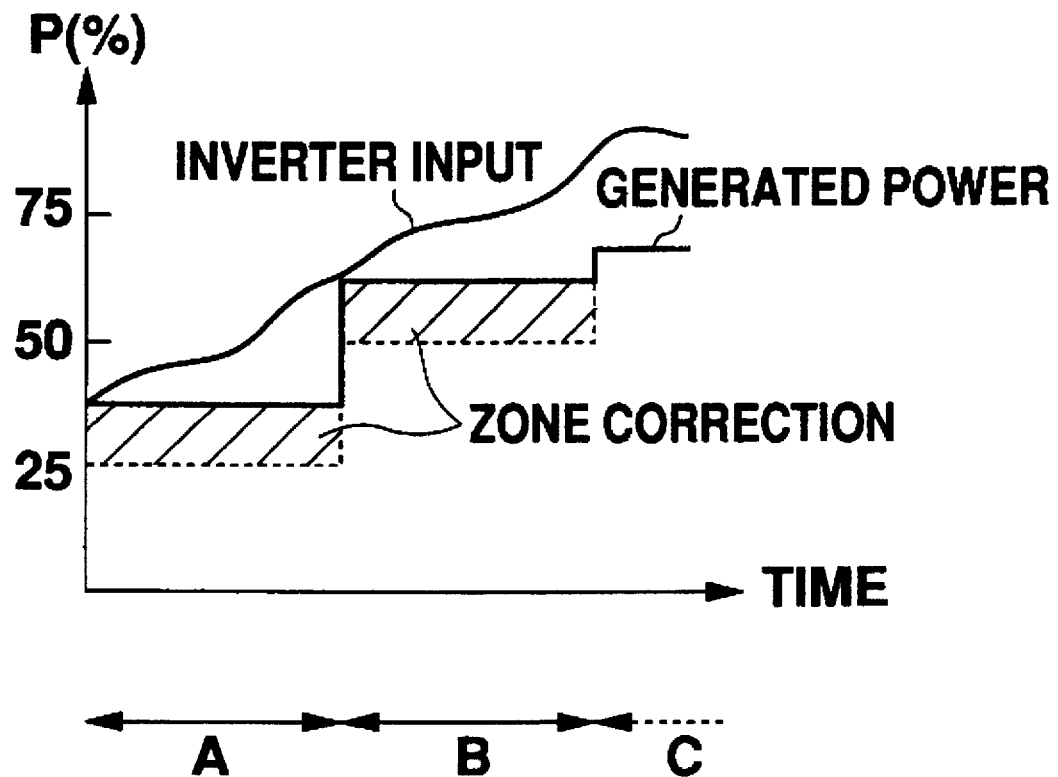
FIG. 7 is a timing chart showing the principle of the third embodiment.

Accordingly, as clearly illustrated in FIG. 7, there lies less difference between the instantaneous inverter input power $P_i$ and the generated power of the generator 18 as compared with the prior art. That is, it is judged from the accelerator angle $\theta_A$ indicating the acceleration requirement for the motor 10 whether the instantaneous inverter input power $P_i$ has an increasing tendency or a decreasing tendency at the end of the averaging period, and the results are reflected on the setting of the target power to be generated, whereby the target power can be set with fewer errors. This will result in appropriate maintenance of the SOC of the battery 16 allowing its life to be prolonged and a suppression of the charge and discharge loss of the battery 16 enabling the vehicle power efficiency to be improved.

Moreover the constant engine speed within a single averaging period will prevent variations in engine speed and their attendant deterioration of the fuel efficiency and emission from occurring, compared with the case where the moving average of the instantaneous inverter input power $P_i$ is set as the target power to be generated. In addition, the use of fixed values, such as 38%, 63%, etc., as well as zoning upon the increase and decrease of the target power, will allow the control of generated power to be far less influenced by the superposed noise which may appear in the average inverter input power $P_m$.

b2) Fourth Embodiment

Figure 8:
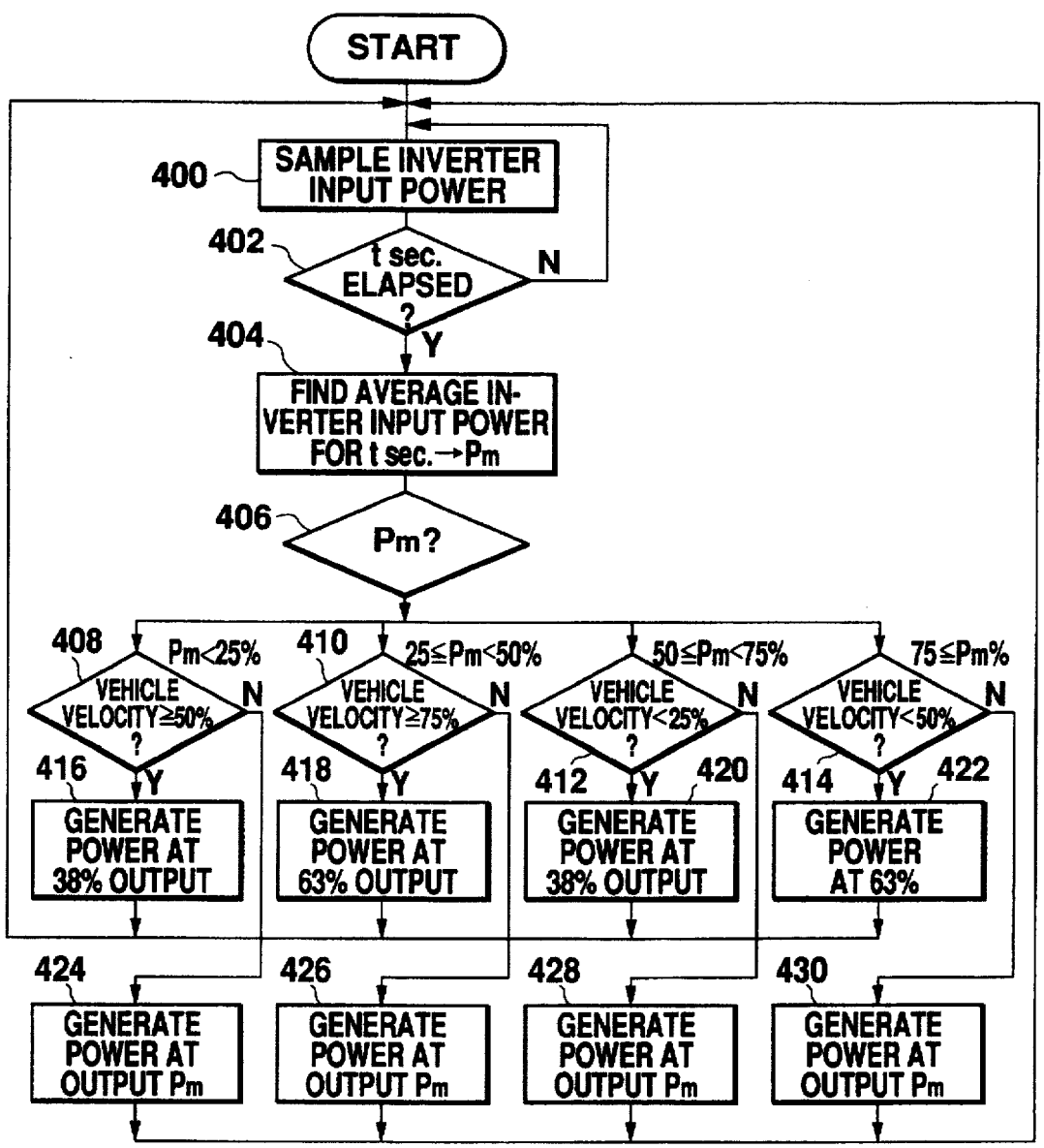
FIG. 8 to 13 are flowcharts respectively showing methods of controlling the generated power in accordance with the fourth to ninth embodiments of the present invention.

Referring to FIG. 8 there is depicted a flow of actions the controller 28 executes for controlling the generated power in the fourth embodiment of the present invention. Among the actions in this embodiment steps 400 to 406 and 416 to 430 are respectively identical with the steps 300 to 306 and 316 to 330 in the third embodiment. This embodiment differs from the third embodiment in that a number of motor rotations N or a vehicle velocity v equivalent thereto are zoned, not the accelerator angle $\theta_A$ in steps 408 to 414 corresponding to the steps 308 to 314 in the third embodiment. More specifically, as shown in table 2, this embodiment employs different target powers to be generated for respective zones v <25%, 25%$\leq$v<50%, 50%$\leq$v<75%, 75%$\leq$v. v=100% is a vehicle velocity corresponding to the permitted maximum number of motor rotations. The hatched areas in the upper left of Table 2 represent zone combinations with which the target power is set to be larger than the average inverter input power $P_m$, and the hatched areas in the lower right of Table 2 represent zone combinations with which the target power is set to be smaller than the average inverter input power $P_m$.

TABLE 1

ZONE CORRECTION IN FOURTH EMBODIMENT v(N)

| $P_m$ | 0–25% | 25–50% | 50–75% | 75–100% |
|---|---|---|---|---|
| 75–100% | 63% | 63% | $P_m$ | $P_m$ |
| 50–75% | 38% | $P_m$ | $P_m$ | $P_m$ |
| 25–50% | $P_m$ | $P_m$ | $P_m$ | 63% |
| 0–25% | $P_m$ | $P_m$ | 38% | 38% |

▨ TARGET POWER < $P_m$

▨ TARGET POWER > $P_m$

Thus, according to this embodiment, for the execution of the same processing as the third embodiment, use is made of the number of motor rotations N or the vehicle velocity v which is one of the elements determining the output power of the motor 10, thereby ensuring the same effects as in the third embodiment. Furthermore the number of rotations N and the vehicle velocity v are smoothed by the inertia of the motor 10, ensuring stabilized zoning actions in the steps 408 to 414 compared with the third embodiment.

b3) Fifth Embodiment

Figure 9:
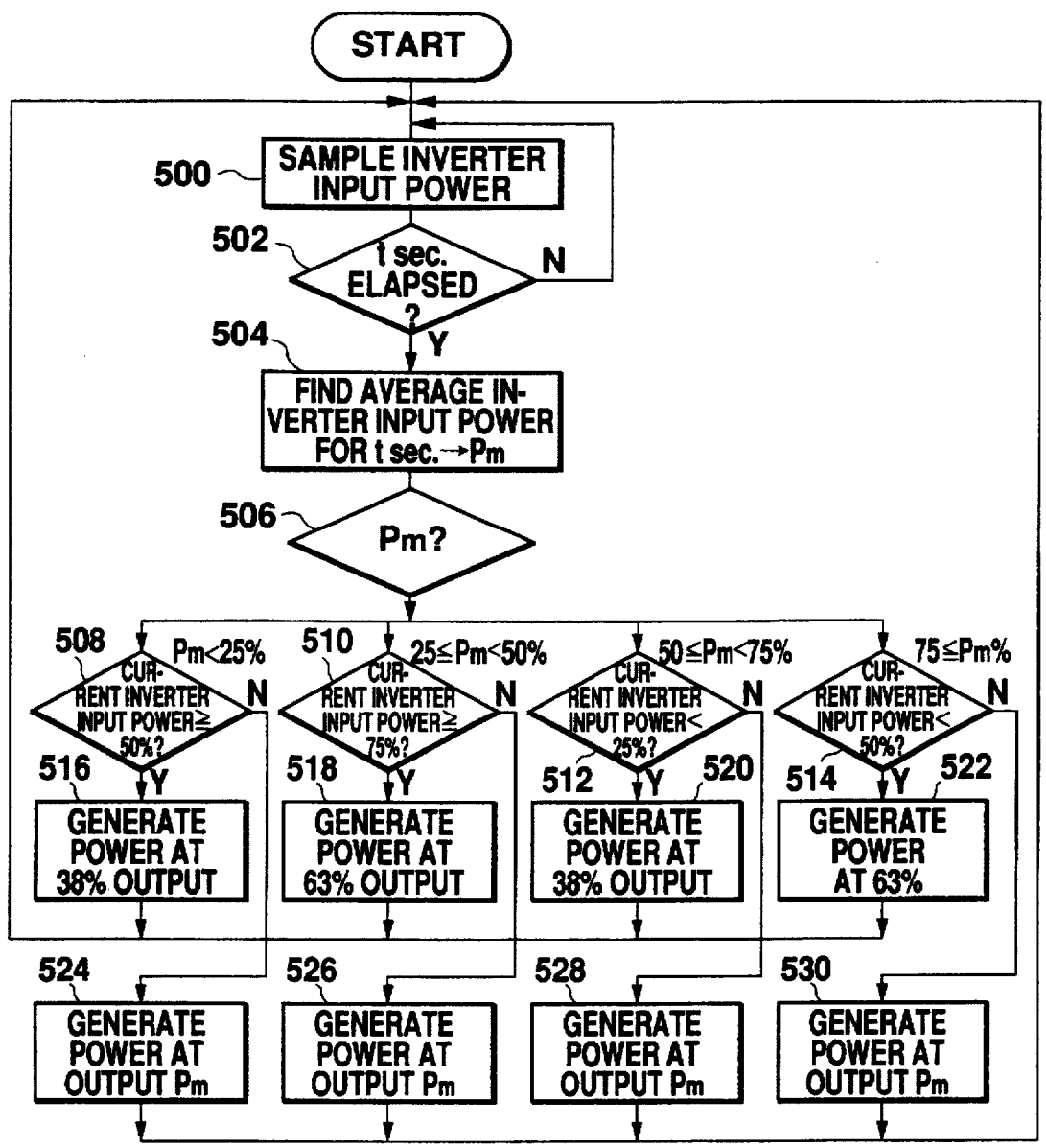

Referring to FIG. 9 there is depicted a flow of actions the controller 28 performs for controlling the generated power in the fifth embodiment of the present invention. Among the actions in this embodiment, steps 500 to 506 and 516 to 530 are respectively identical with the steps 300 to 306 and 316 to 330 in the third embodiment.

This embodiment differs from the third embodiment in that the instantaneous inverter input power $P_i$ is zoned, not the accelerator angle $\theta_A$, in steps 508 to 514 corresponding to the steps 308 to 314 in the third embodiment. More specifically, as is apparent from Table 3, this embodiment employs different target powers to be generated for the zones $P_i$<25%, 25%≤$P_i$<50%, 50%≤$P_i$<75%, 75%≤$P_i$. The hatched areas in the upper left in Table 3 represent zone combinations allowing the target power to be set larger than the average inverter input power $P_m$, and the hatched areas in the lower right in Table 3 represent zone combinations allowing the target power to be set smaller than the average inverter input power $P_m$.

TABLE 1

ZONE CORRECTION IN FIFTH EMBODIMENT $P_i$

| $P_m$ | 0–25% | 25–50% | 50–75% | 75–100% |
|---|---|---|---|---|
| 75–100% | 63% | 63% | $P_m$ | $P_m$ |
| 50–75% | 38% | $P_m$ | $P_m$ | $P_m$ |
| 25–50% | $P_m$ | $P_m$ | $P_m$ | 63% |
| 0–25% | $P_m$ | $P_m$ | 38% | 38% |

▨ TARGET POWER < $P_m$

▨ TARGET POWER > $P_m$ $P_i$: INSTANTANEOUS INVERTER INPUT POWER

Thus, according to this embodiment, for the execution of the same processing as the third embodiment, use is made of both the output power of the motor 10 and the instantaneous inverter input power $P_i$ reflecting its tendency, thereby ensuring the same effects as in the third embodiment. In addition the use of the instantaneous inverter input power $P_i$ in this embodiment will eliminate the need to input the external variables such as accelerator angle $\theta_A$.

c) Modification of Target Power by Modification Terms c1) Sixth Embodiment

Figure 10:
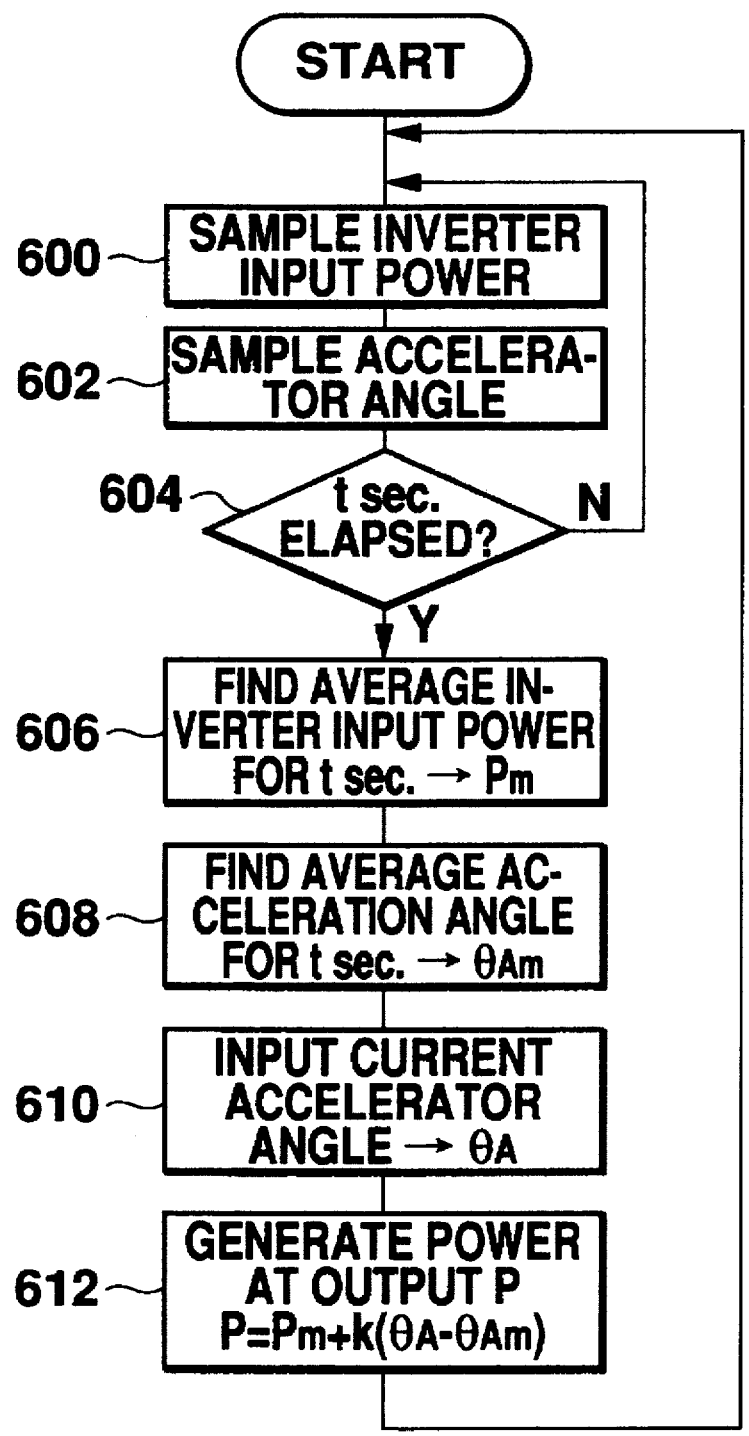

Referring to FIG. 10 there is depicted a flow of actions the controller 28 performs in the sixth embodiment of the present invention. This embodiment is common to the third embodiment in that use is made of the value of the accelerator angle $\theta_A$ at the end of the averaging period for setting the target power to be generated in the next averaging period. However, this embodiment differs from the third embodiment in that the modification terms are substituted for the target power setting expression instead of zoning and zone comparisons.

The controller 28 first samples the instantaneous inverter input power $P_i$ and the accelerator angle $\theta_A$ a plurality of times for respective averaging periods having a duration t (600 to 604). Then the controller 28 finds the average inverter input power $P_m$ and the average accelerator angle $\theta_{Am}$ in the averaging period (606, 608). Thereupon the controller 28 detects the accelerator angle $\theta_A$ at the point of time immediately before setting the target power to be generated (610). Subsequently the controller 28 finds from the following expression (5) the target power P in the next average period (612). At that time, as is apparent from the expression (5), added to the average inverter input power $P_m$ is a modification term including the average accelerator angle $\theta_{Am}$ found in the step 608 and the accelerator angle $\theta_A$ found in the step 610. It is to be noted that k included in the modification term is a coefficient determining the response of the target power P for the accelerator angle $\theta_A$.

$$P=P_m+k(\theta_A-\theta_{Am}) \qquad (5)$$

Thus according to this embodiment, the same effects as in the third embodiment can be obtained using the simple expression (5). Additionally the use of the expression (5) will allow the tendency of the accelerator angle $\theta_A$ to be positively reflected in the power generation control more closely than the third embodiment, consequently heightening the effects such as reduction of errors in the control of the generated power and therefore the improvement of the fuel efficiency and emission, as well as the maintenance of the SOC and the prolonging of the life of the battery.

c2) Seventh Embodiment

Figure 11:
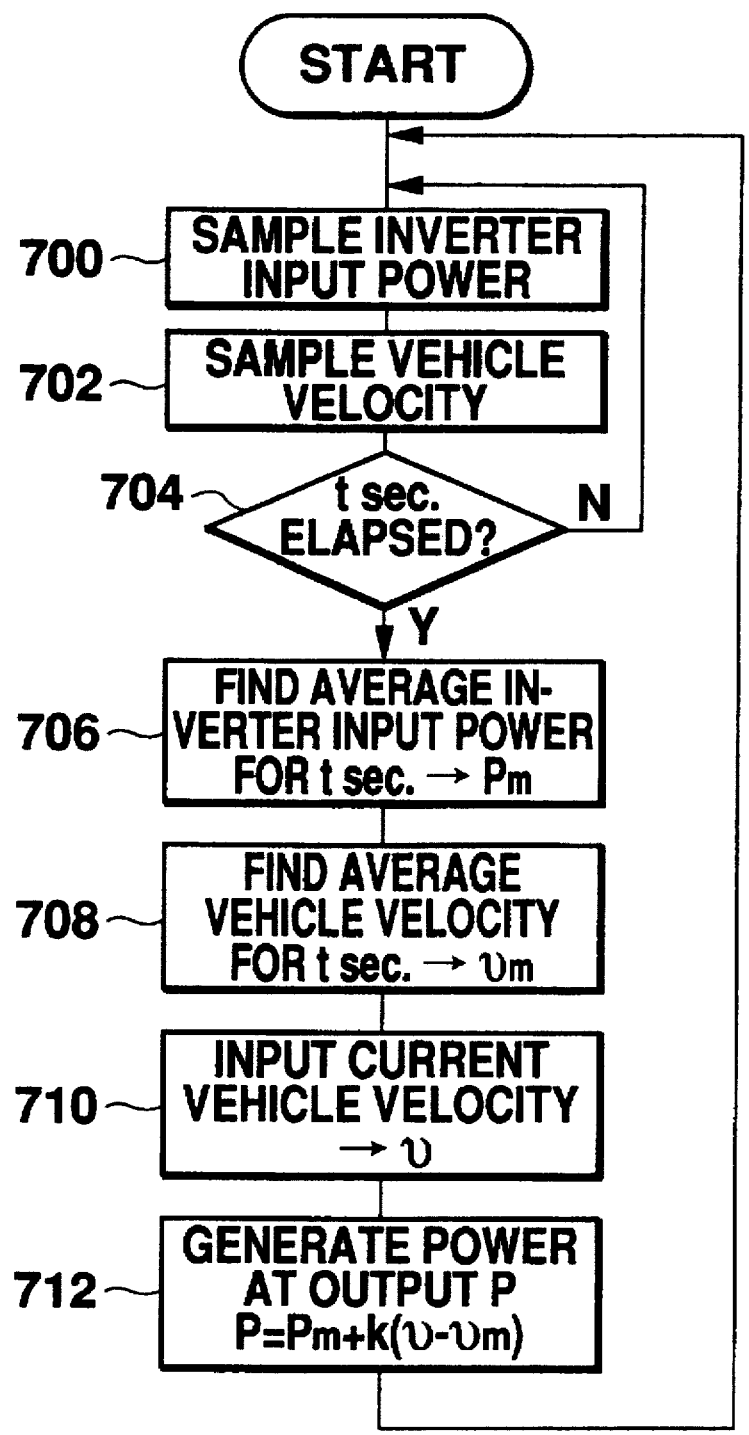

Referring to FIG. 11 there is depicted a flow of actions the controller 28 executes for controlling the generated power in the seventh embodiment of the present invention. Among the actions in this embodiment, steps 700, 704 and 706 are identical with the steps 600, 604 and 606 in the sixth embodiment. In this embodiment, steps 702, 708, 710 and 712, corresponding to the steps 602, 608 and 610 and 612 in the sixth embodiment, are intended for the vehicle velocity v or the number of motor rotations equivalent thereto instead of the acceleration angle $\theta_A$. Thus according to this embodiment, the same effects as in the sixth embodiment can be obtained. Furthermore the vehicle velocity for use in this embodiment is subjected to smoothing by the inertia of the motor 10, which will contribute to the stabilized control of generated power.

c3) Eight Embodiment

Figure 12:
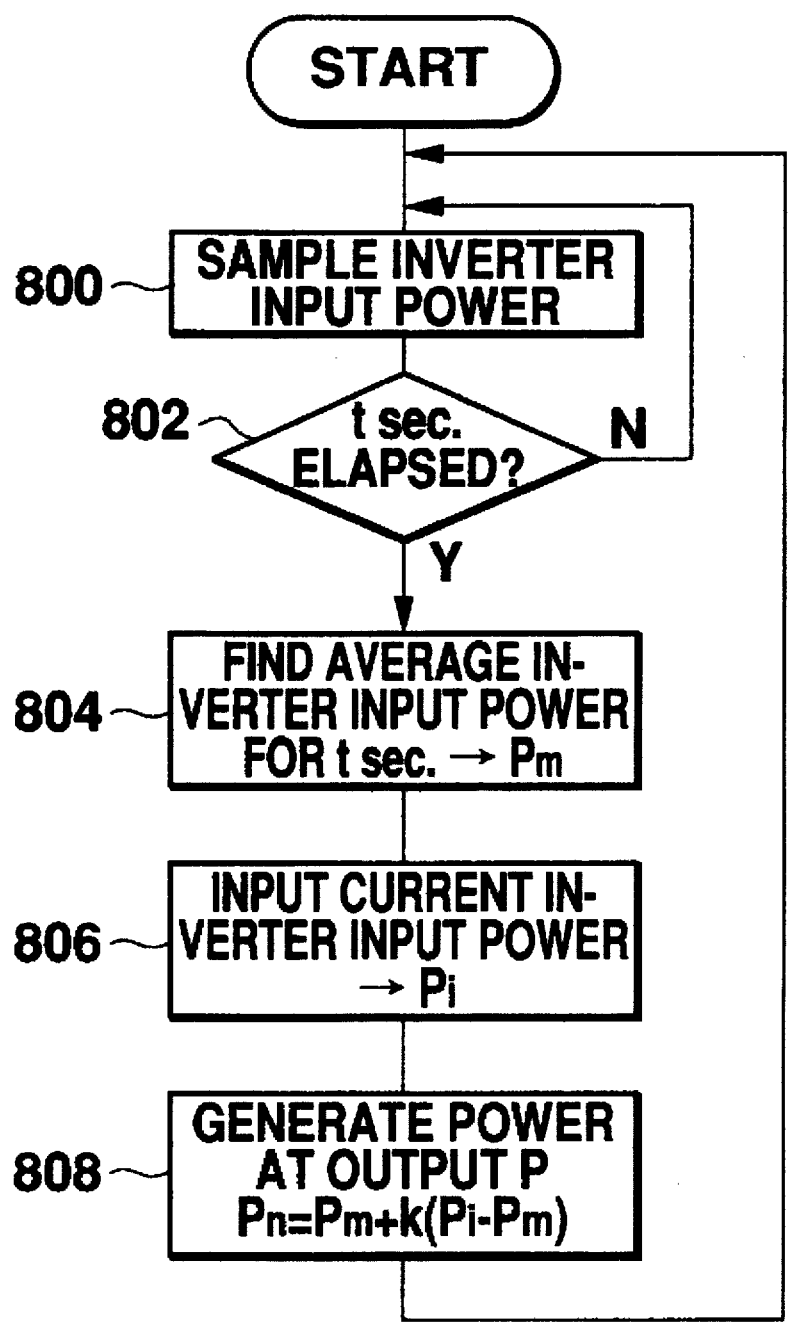

Referring to FIG. 12 there is depicted a flow of actions the controller 28 executes for controlling the generated power in the eighth embodiment of the present invention. Among the actions in this embodiment, steps 800 to 804 are respectively identical with the steps 600, 604 and 606 in the sixth embodiment. This embodiment does not include steps corresponding to the steps 602 and 608 in the sixth embodiment, but includes steps 806 and 808 corresponding respectively to the steps 610 and 612 and intended for the instantaneous inverter input power $P_i$ instead of the accelerator angle $\theta_A$. In consequence this embodiment will ensure the same effects as obtained in the sixth embodiment and eliminate the need to input the external variables such as the accelerator angle $\theta_A$.

d) Modification of Averaging Period d1) Ninth Embodiment

Figure 13:
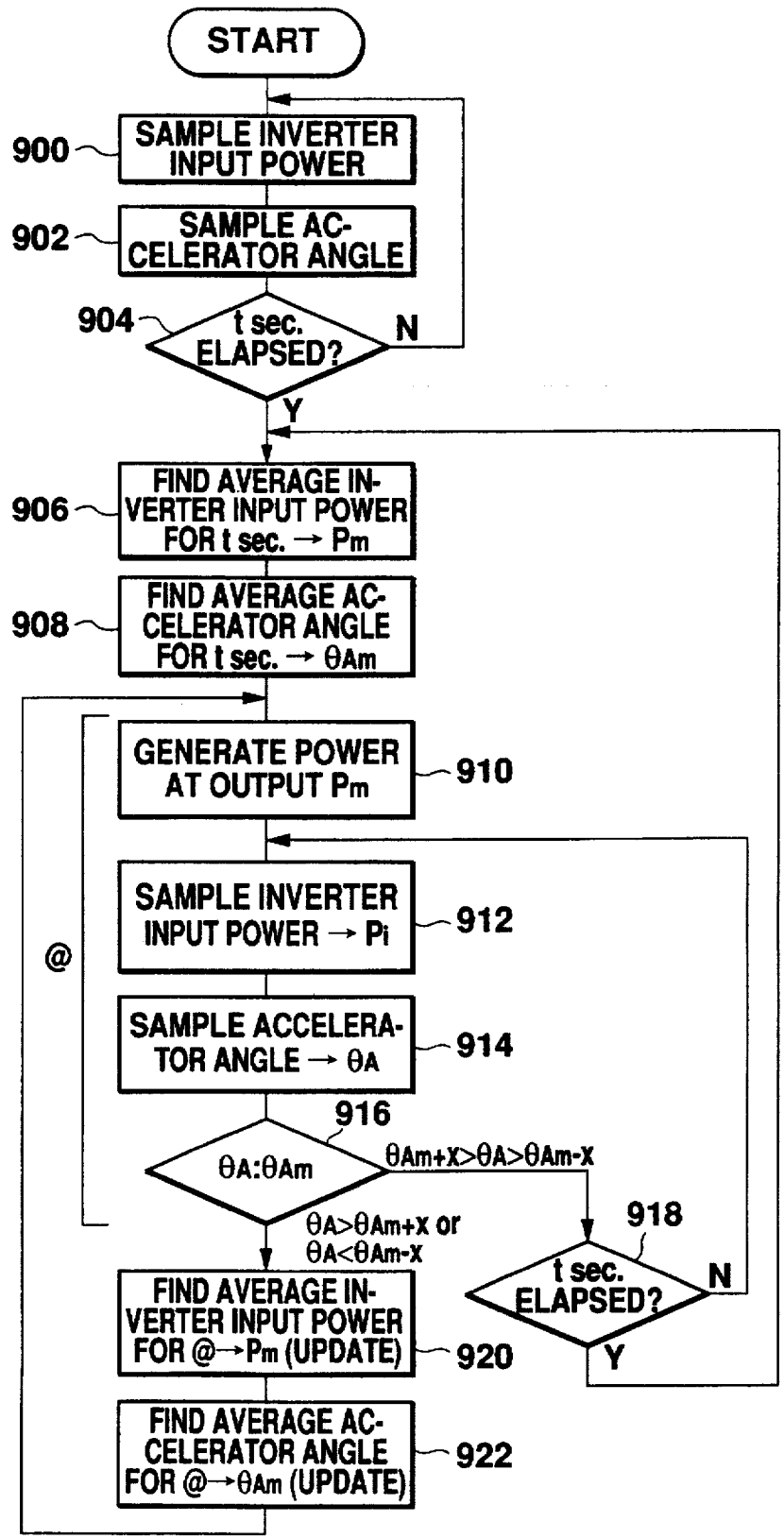

Referring to FIG. 13 there is depicted a flow of actions the controller 28 executes for controlling the generated power in the ninth embodiment. Different from the third to eighth embodiments, this embodiment subjects the averaging period to a modification without modifying the target power to be generated.

The controller 28 first samples the instantaneous inverter input power $P_i$ and the accelerator angle $\theta_A$ a plurality of times for respective averaging periods having a duration t (900 to 904). From the results, the controller 28 finds the average inverter input power $P_m$ and the average accelerator angle $\theta_{Am}$ for the averaging period (906, 908). At that point of time the controller 28 uses as the target power the average inverter input power $P_m$ in the conventional manner to control the generated power (910). Afterwards during the next control period of time t, i.e., by the end of the averaging period (916), the controller 28 repeats the actions through steps 906 to 914 unless the accelerator angle $\theta_A$ varies remarkably (918).

By the time the current averaging period comes to an end after starting the control of the generated power with the average inverter input power $P_m$ obtained in step 906 as its target (918), if the accelerator angle $\theta_A$ has varied remarkably (916), the controller 28 will operate both the average inverter input power $P_m$ and the average accelerator angle $\theta_{Am}$ with respect to the period during which the actions (steps 910 to 918) indicated by @ in the diagram are executed (920, 922). For the execution of this action the controller 28 samples the instantaneous inverter input power $P_i$ and accelerator angle $\theta_A$ in steps 912 and 914 previous to the step 916. Then the controller 28 starts the action indicated by @ using new average inverter input power $P_m$ and average accelerator angle $\theta_{Am}$ derived from the operation.

In the diagram reference letter x denotes an infinitesimal value for judging the degree of change of the accelerator angle $\theta_A$. If $\theta_{Am}-x<\theta_A<\theta_{Am}+x$ is established, then it is judged that the accelerator angle $\theta_A$ has not changed remarkably, whereas with $\theta_A<\theta_{Am}-x$ or $\theta_{Am}+x<\theta_A$ the accelerator angle $\theta_A$ is judged to have changed remarkably.

Figure 14:
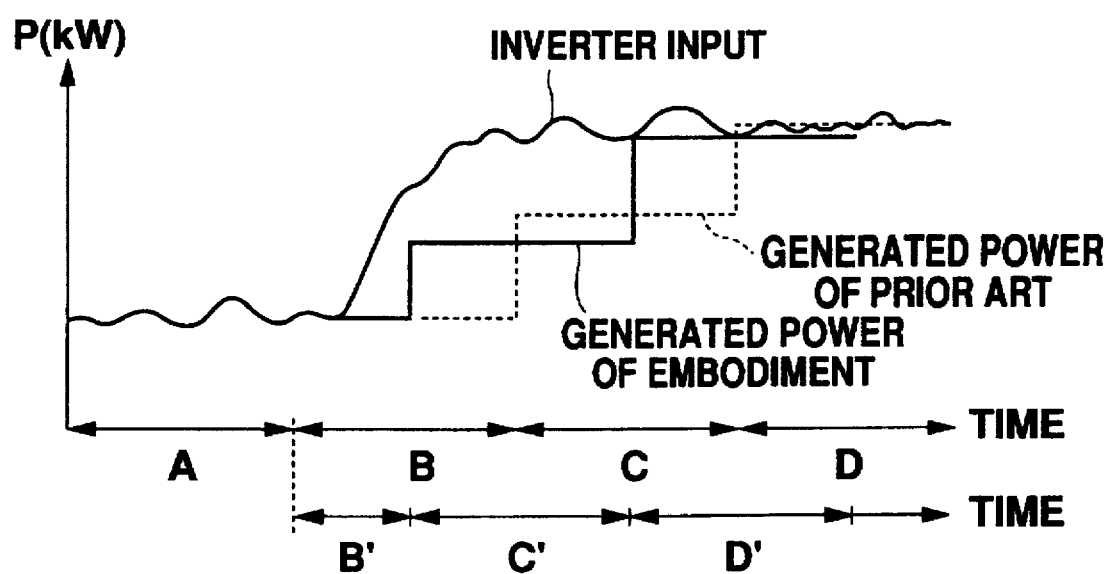
FIG. 14 is a timing chart showing the principle of the ninth embodiment.

Thus, according to the present invention, when a sharp change has occurred in the accelerator angle $\theta_A$, the target power to be generated is updated without waiting for the end of the current averaging period whereby the difference between the inverter input power and the generated power will be diminished compared with the prior art as shown in FIG. 14. In other words, this embodiment makes it possible to appropriately set the target power updating timing since it monitors the accelerator angle $\theta_A$ and therefore the tendency of the required output power for the motor 10 and allows the results to reflect in the target power. In the same manner as the first embodiment, this will result in, for example, an prolonged life of the battery 16 due to the maintenance of its SOC, the prevention of the loss in the vehicle power efficiency on account of the charge and discharge loss of the battery 16, and the improvement of the fuel efficiency and emission. Furthermore its ability to respond to the sharp change of the accelerator angle $\theta_A$ will prevent the battery 16 from being overdischarged or being overcharged irrespective of abrupt acceleration or abrupt braking of the vehicle. Accordingly this embodiment will eliminate the necessity of setting shorter averaging periods to cope with the abrupt changes, thus making it possible to suppress the changes in the engine speed with longer averaging periods and to further improve the emission and fuel efficiency.

d2) Tenth Embodiment

Figure 15:
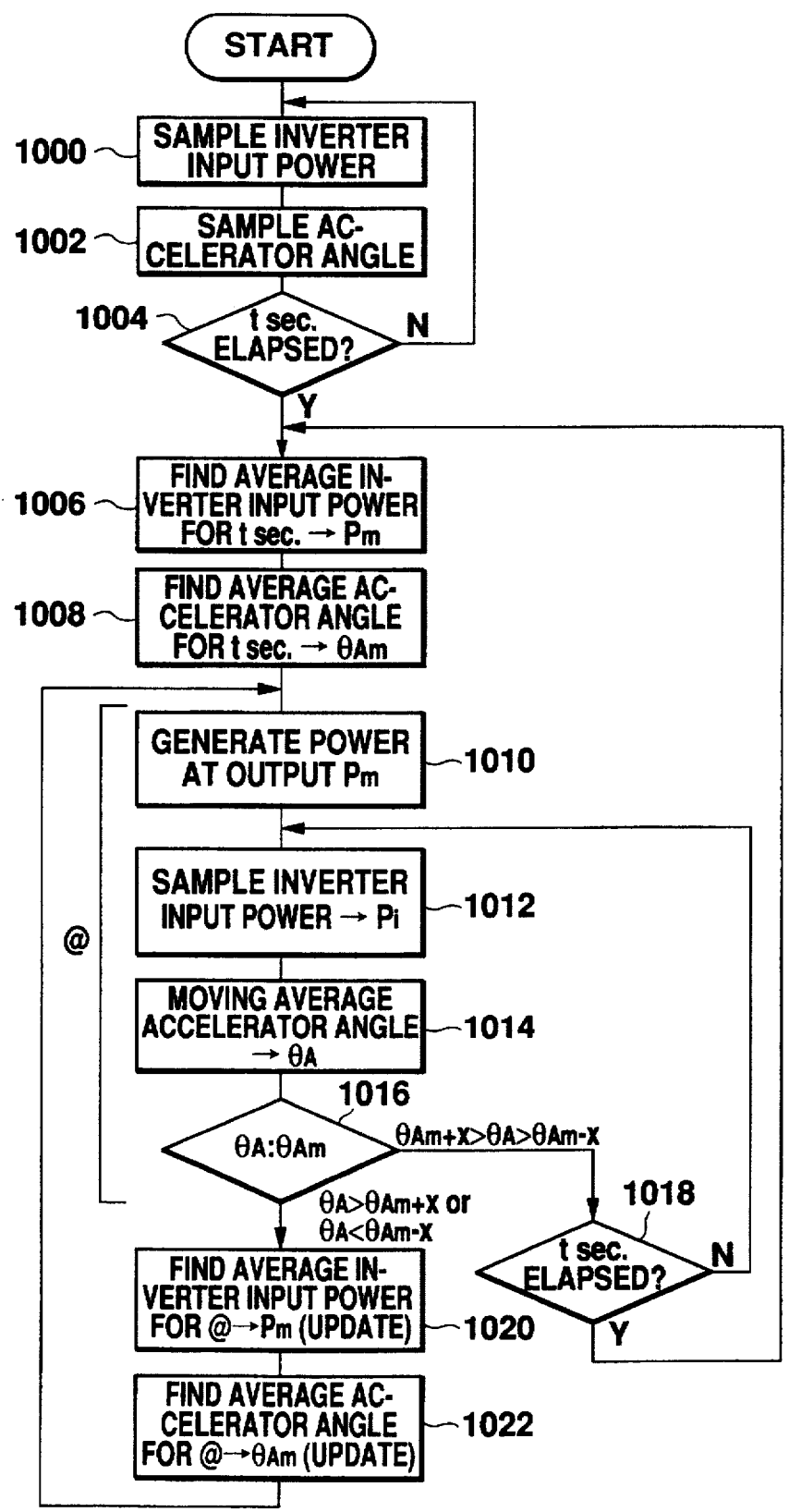
FIG. 15 to 23 are flowcharts respectively showing methods of controlling the generated power in accordance with the tenth to eighteenth embodiments of the present invention.

Referring to FIG. 15 there is depicted a flow of actions the controller 28 executes for controlling the generated power in the tenth embodiment of the present invention. The contents of steps 1000 to 1012 and 1016 to 1022 in this embodiment are substantially the same as those of the steps 900 to 912 and 916 to 922 in the ninth embodiment.

In step 1014, however, the controller 28 not only samples the accelerator angle $\theta_A$ as in the step 914 but also calculates a moving average of the sampled accelerator angle $\theta_A$. The accelerator angle $\theta_A$ being generally liable to the abrupt changes, the execution of such moving averaging operation will enable high-frequency fluctuation components to be removed from the accelerator angle $\theta_A$, contributing to a stabler control.

d3) Eleventh Embodiment

Figure 16:
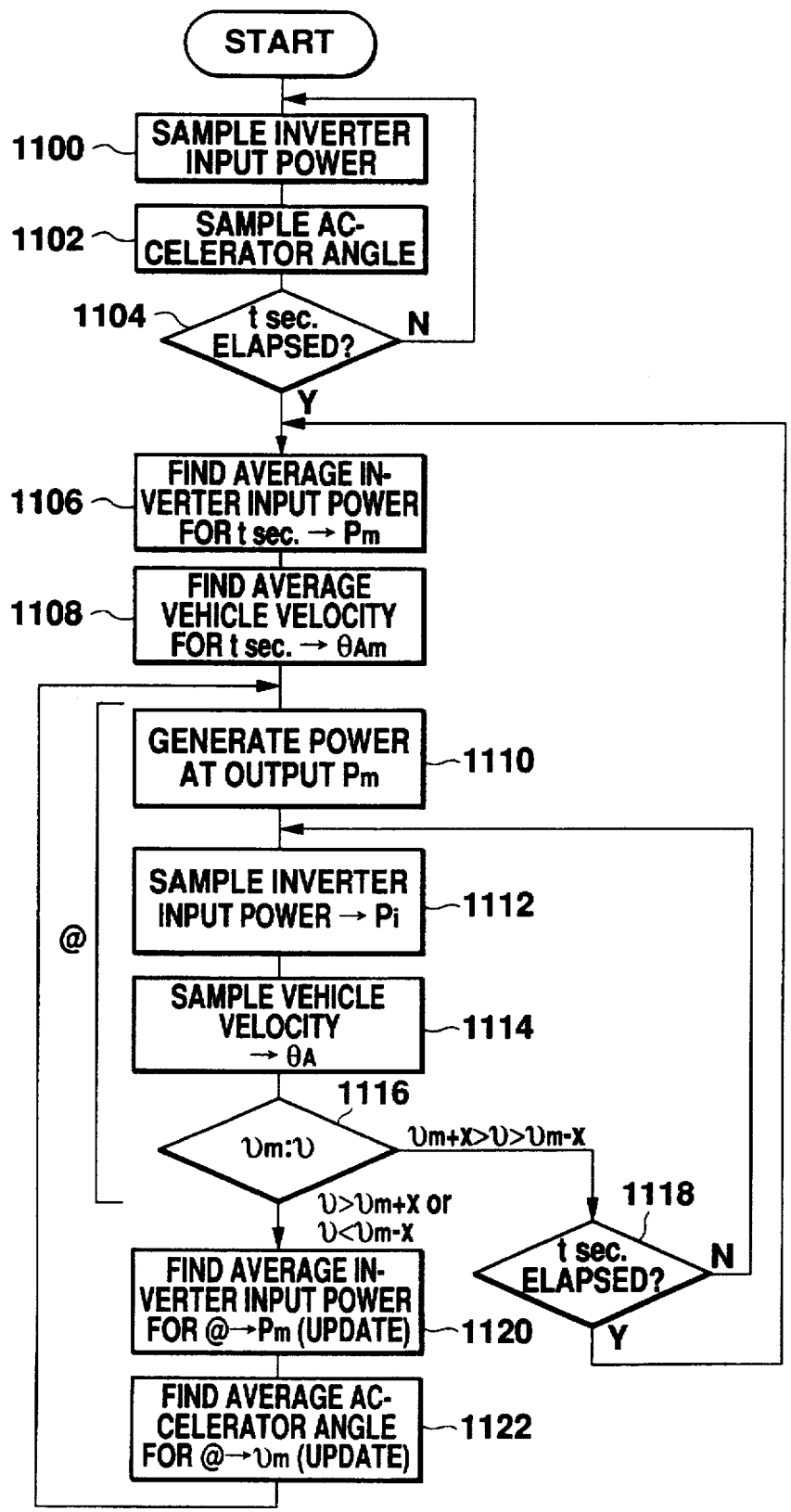

Referring to FIG. 16 there is depicted a flow of actions the controller 28 executes for controlling the generated power in the eleventh embodiment of the present invention. The contents of steps 1100 to 1122 in this embodiment are substantially the same as those of the steps 900 to 922 in the ninth embodiment.

It is to be appreciated that the steps 1102, 1108, 1114, 1116 and 1122 of this embodiment employ the vehicle velocity v or the number of rotations of the motor 10 equivalent thereto in lieu of the accelerator angle $\theta_A$ in the steps 902, 908, 914, 916 and 922 of the ninth embodiment. More specifically, if the vehicle velocity v has abruptly changed relative to the average vehicle velocity $v_m$ when the action indicated by @ is being executed (1116), the target power to be generated is updated (1110) in accordance with the average dissipation power $P_m$ during the execution of the action indicated by @ (1120).

Thus, according to this embodiment, the same effects as in the ninth embodiment can be obtained. In addition the smoothing of the vehicle velocity v by the inertia of the motor 10 will contribute to a stabler control.

Figure 17:
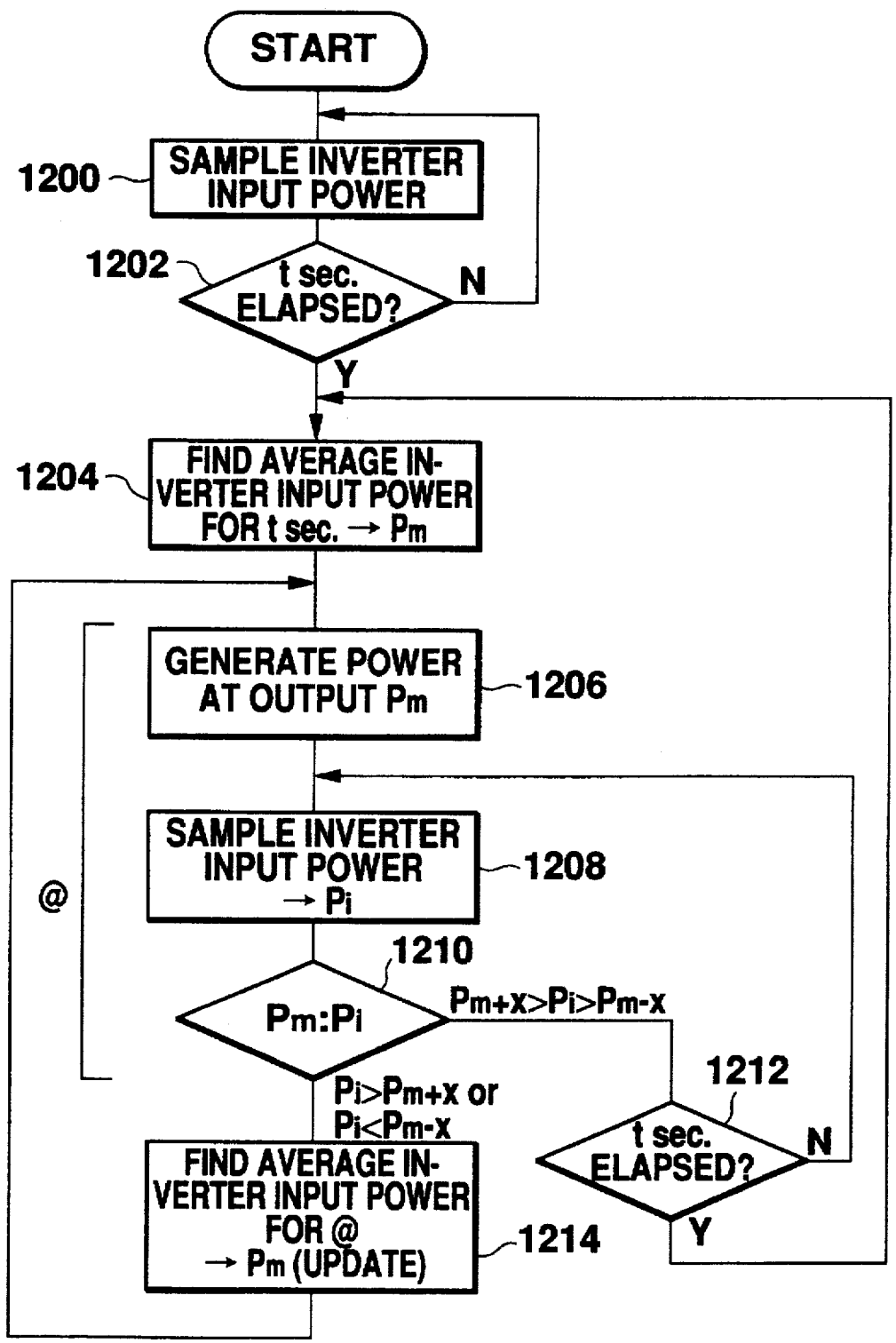

4) Twelfth Embodiment Referring to FIG. 17 there is depicted a flow of actions the controller 28 executes for controlling the generated power in the twelfth embodiment of the present invention. The contents of steps 1200 to 1208, 1212 and 1214 in this embodiment are respectively the same as those of the steps 900, 904, 906, 910, 912, 918 and 920 in the ninth embodiment.

Figure 18:
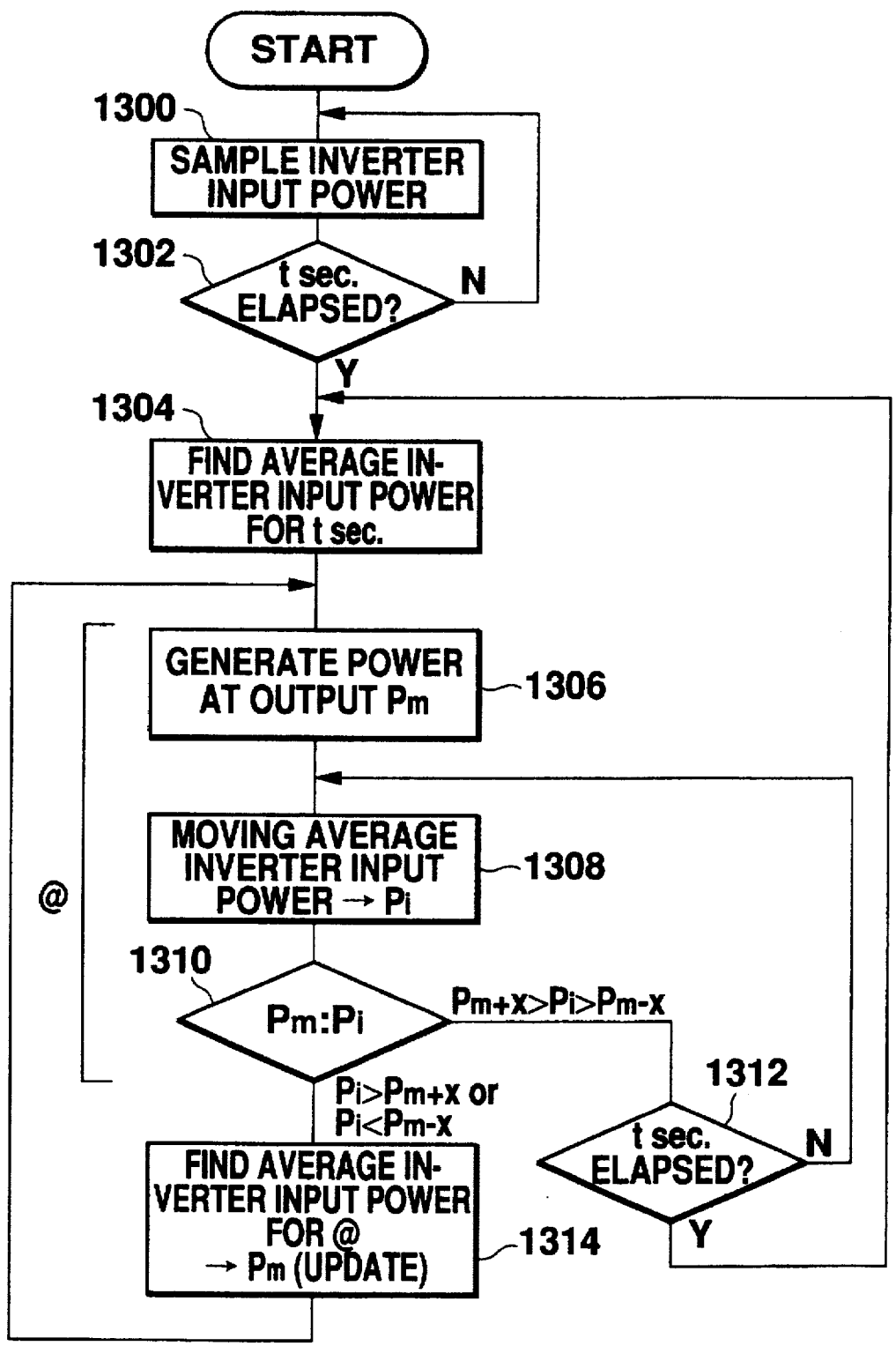

However, this embodiment does not execute the actions corresponding to the steps 902, 908, 914 and 922 in the ninth embodiment but includes step 1210 corresponding to the step 916 in which the instantaneous inverter input power $P_i$ is compared with the average inverter input power $P_m$ for judgment. Thus, this embodiment will ensure the same effects as in the ninth embodiment and eliminate the need to use the external variables such as accelerator angle $\theta_A$ and vehicle velocity v.

d5) Thirteenth Embodiment Referring to FIG. 18 there is depicted a flow of actions the controller 28 executes for controlling the generated power in the thirteenth embodiment of the present invention. The contents of steps 1300 to 1306 and 1310 to 1314 in this embodiment are substantially the same as those of the steps 1200 to 1206 and 1210 to 1214 in the twelfth embodiment. This embodiment differs from the twelfth embodiment in that executed in step 1308 are not only the sampling of the instantaneous inverter input power $P_i$ but also the moving averaging operation.

The instantaneous inverter input power $P_i$ being generally liable to the abrupt changes, the execution of such a moving averaging operation will enable high-frequency fluctuation components to be removed from the instantaneous inverter input power $P_i$, contributing to a stabler control.

d6) Fourteenth Embodiment

Figure 19:
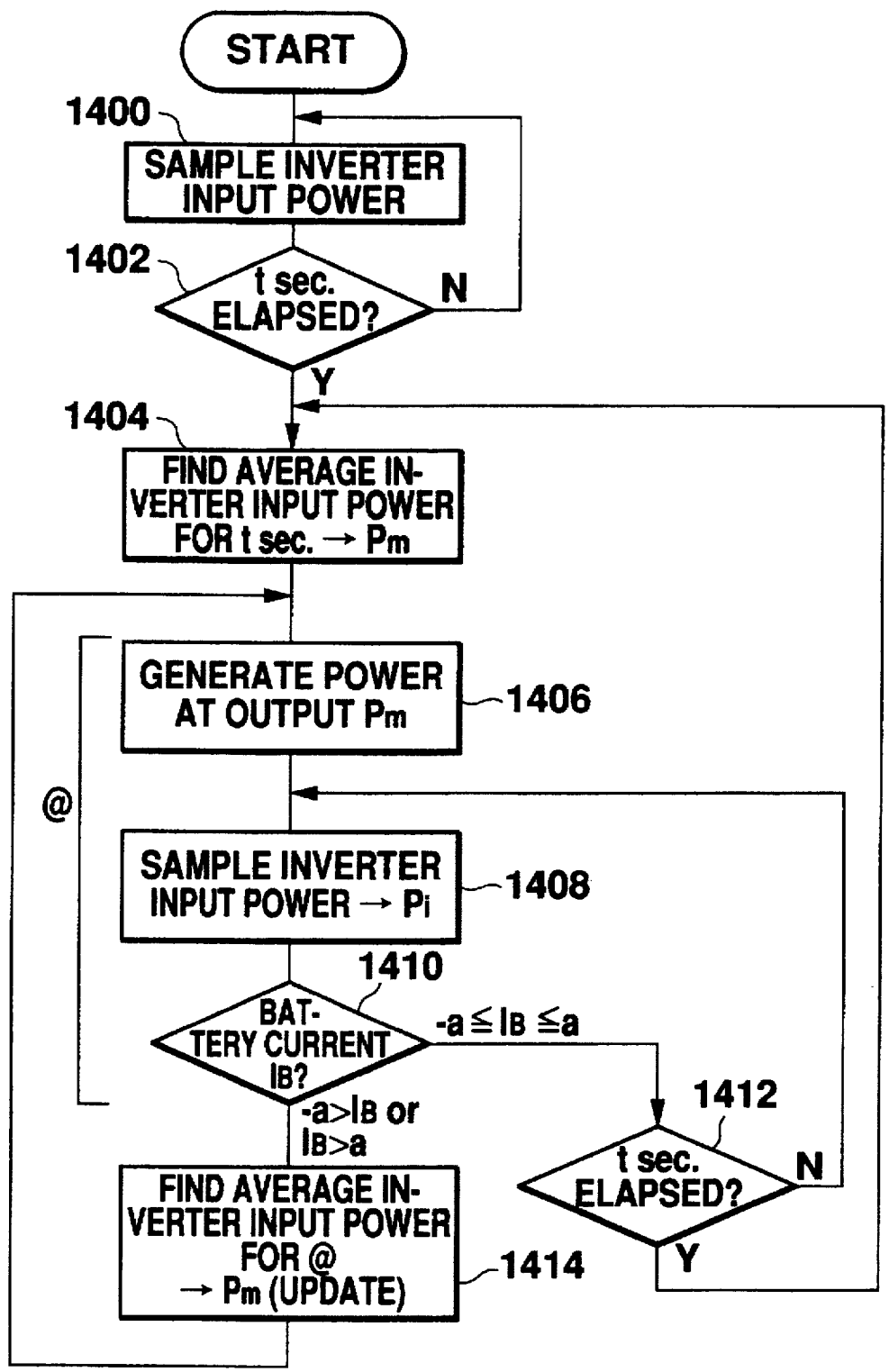

Referring to FIG. 19 there is depicted a flow of actions the controller 28 executes for controlling the generated power in the fourteenth embodiment of the present invention. The contents of steps 1400 to 1408, 1412 and 1414 in this embodiment are substantially the same as those of the steps 1200 to 1208, 1212 and 1214 in the twelfth embodiment.

In step 1410, however, a battery current $I_B$ which is one of the quantities indicating the state of loading of the battery 16 is used for judgement in place of the quantity employed in the ninth to thirteenth embodiments, i.e., the required output power for the motor 10 or the quantity associated with the output power of the motor 10. Thus after the execution of the step 1408, the controller 28 judges whether or not the battery current $I_B$ lies within the range $-a<I_B<a$ (1410). Reference letter a denotes a threshold value for judging whether or not the battery 16 is charged and discharged to a significant degree. The action of the controller 28 advances, if the conditions of the step 1410 are satisfied, to the step 1412, but if not, to the step 1414.

Accordingly this embodiment will ensure the same effects as obtained in the ninth embodiment and allow the state of loading of the battery 16 to be reflected on the control at a higher speed than the ninth embodiment, etc. since the state of loading of the battery 16 is detected for direct use in the control.

d7) Fifteenth Embodiment

Figure 20:
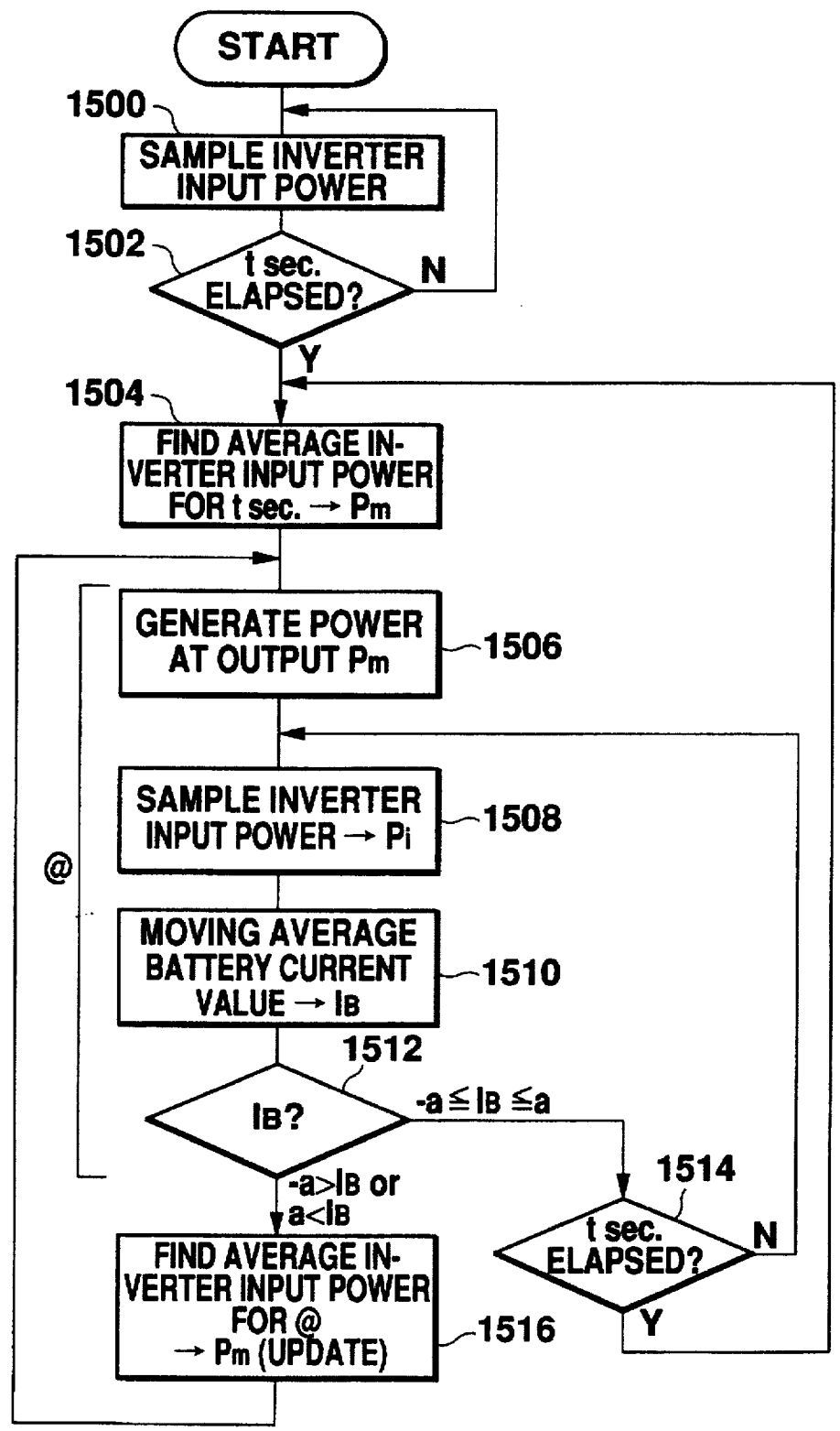

Referring to FIG. 20 there is depicted a flow of actions the controller 28 executes for controlling the generated power in the tenth embodiment of the present invention. The actions of steps 1500 to 1508 and 1512 to 1516 in this embodiment are substantially the same as those of the steps 1400 to 1408 and 1412 to 1416 in the fourteenth embodiment. This embodiment differs from the fourteenth embodiment in that the battery current $I_B$ is subjected to the moving averaging in step 1510 corresponding to the step 1410, which will enable high-frequency components of the battery current $I_B$ to be removed, leading to the realization of a stabler control.

d8) Sixteenth Embodiment

Figure 21:
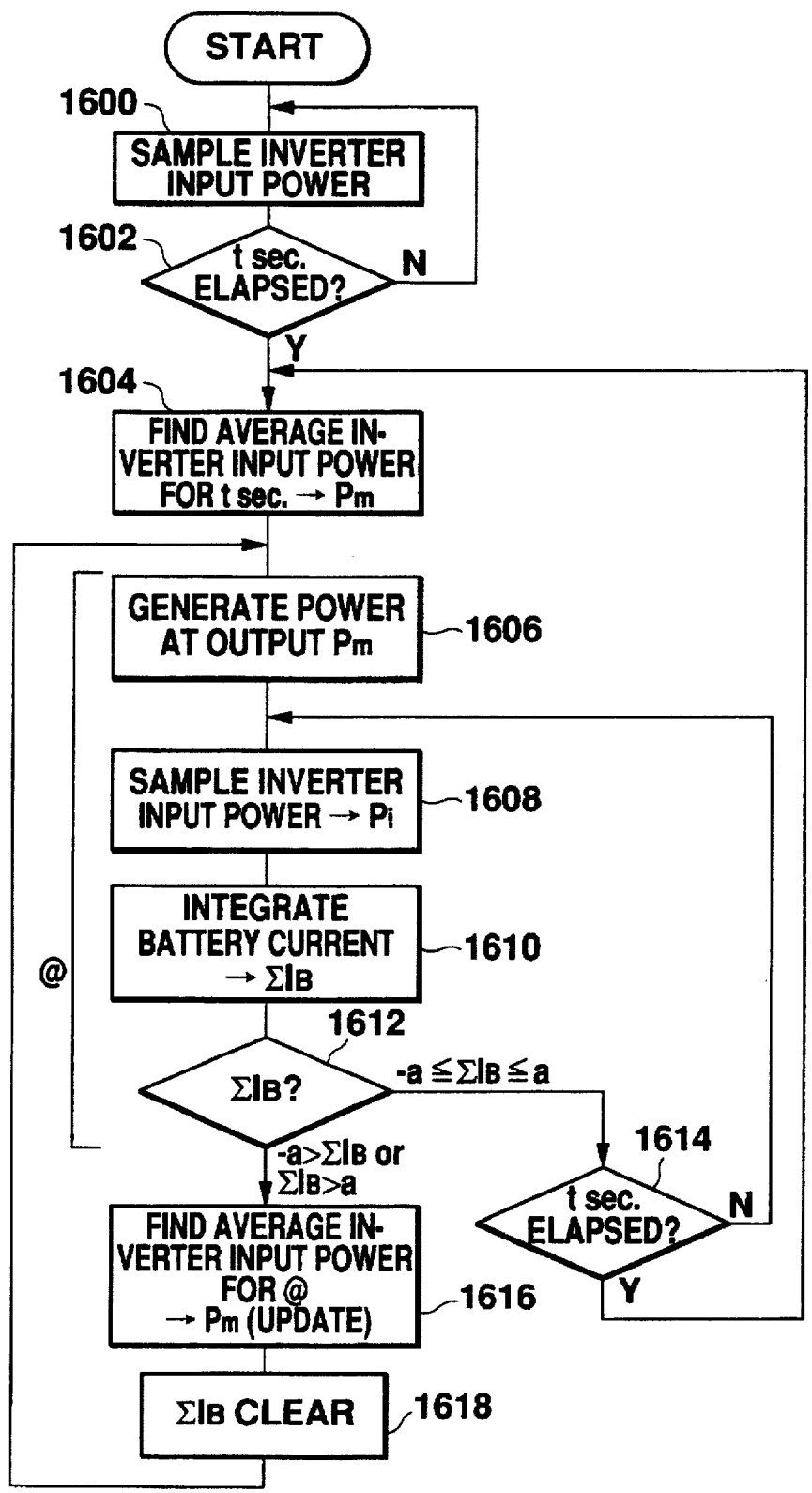

Referring to FIG. 21 there is depicted a flow of actions the controller 28 executes for controlling the generated power in the sixteenth embodiment of the present invention. The actions of steps 1600 to 1608, 1614 and 1616 in this embodiment are respectively the same as those of the steps 1400 to 1408, 1412 and 1414 in the fourteenth embodiment. In this embodiment, however, simultaneously with the execution of the step 1608 the battery currents $I_B$ are accumulated (1610) and the object to be judged in the subsequent step 1612 is an accumulated value $\Sigma I_B$ (the quantity of charged and discharged currents) of the battery currents $I_B$. The logic for judgment is substantially the same as that in the fourteenth embodiment. This will allow the high-frequency components of the battery currents $I_B$ to be removed, leading to the realization of a stabler control. It is to be noted that this embodiment needs step 1618 for clearing the accumulated value $\Sigma I_B$.

d9) Seventeenth Embodiment

Figure 22:
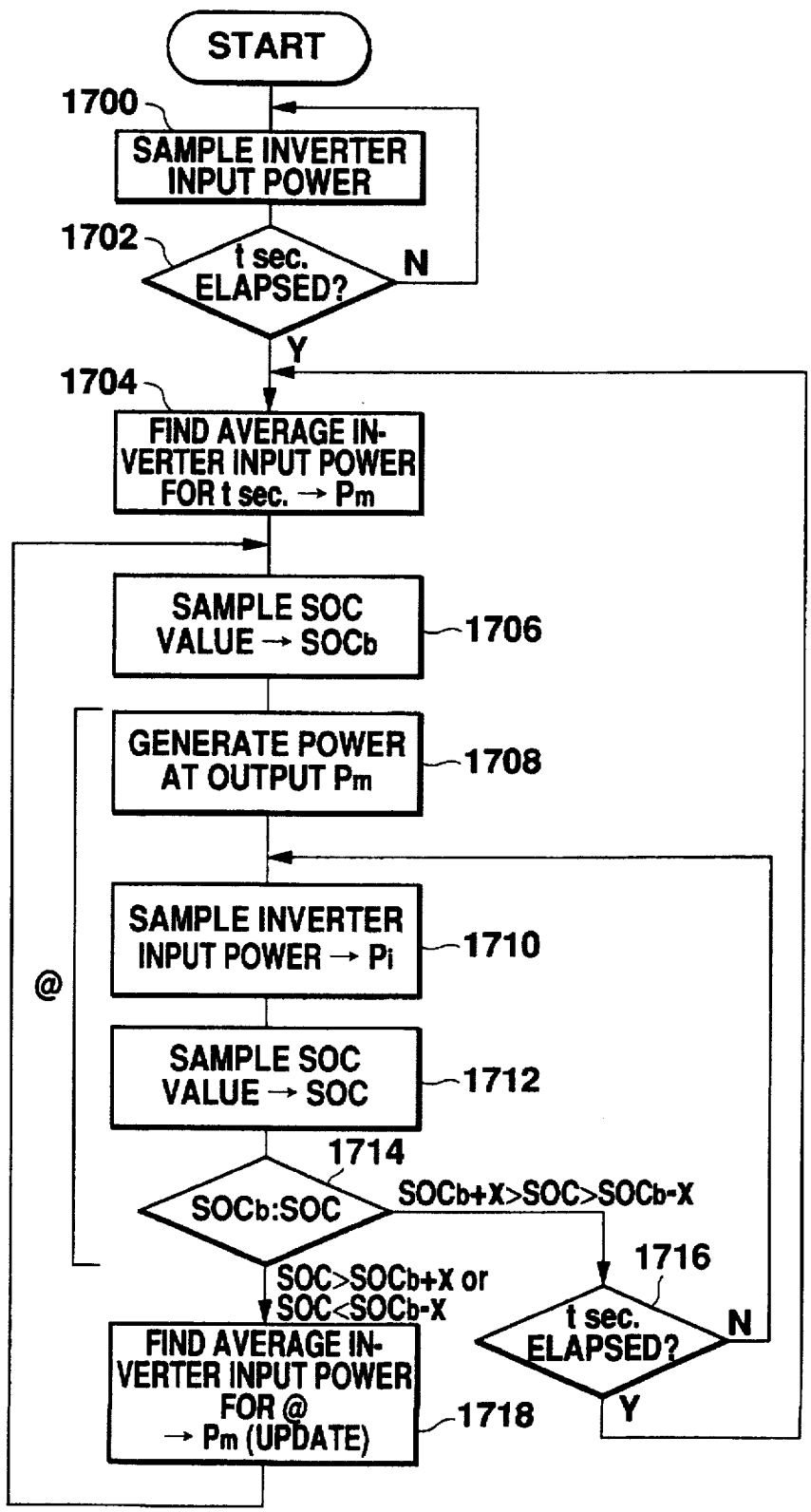

Referring to FIG. 22 there is depicted a flow of actions the controller 28 executes for controlling the generated power in the seventeenth embodiment of the present invention. The actions of steps 1700 to 1704, 1708, 1710, 1716 and 1718 in this embodiment are substantially the same as those of the steps 1500 to 1508, 1514 and 1516, respectively.

In this embodiment, however, the SOC of the battery 16 is sampled (1706) previous to the step 1708, the SOC of the battery 16 is sampled (1712) previous to the step 1714, and thereafter the sampled value $SOC_b$ obtained in the step 1706 is compared with the sampled value SOC obtained in the step 1712 (1714).

Here the SOC of the battery 16 is a value obtained by adding and subtracting the quantity of charged and discharged currents to and from the full capacity of the battery 16 by the controller 28, while on the contrary the quantity of charged and discharged currents are the accumulated value of the battery currents $I_B$ as described above. Thus, this embodiment ensures the same effects as obtained in the sixteenth embodiment.

e) Combinations

The above-described embodiments may be combined with one another in a suitable manner.

e1) Eighteenth Embodiment

Figure 23:
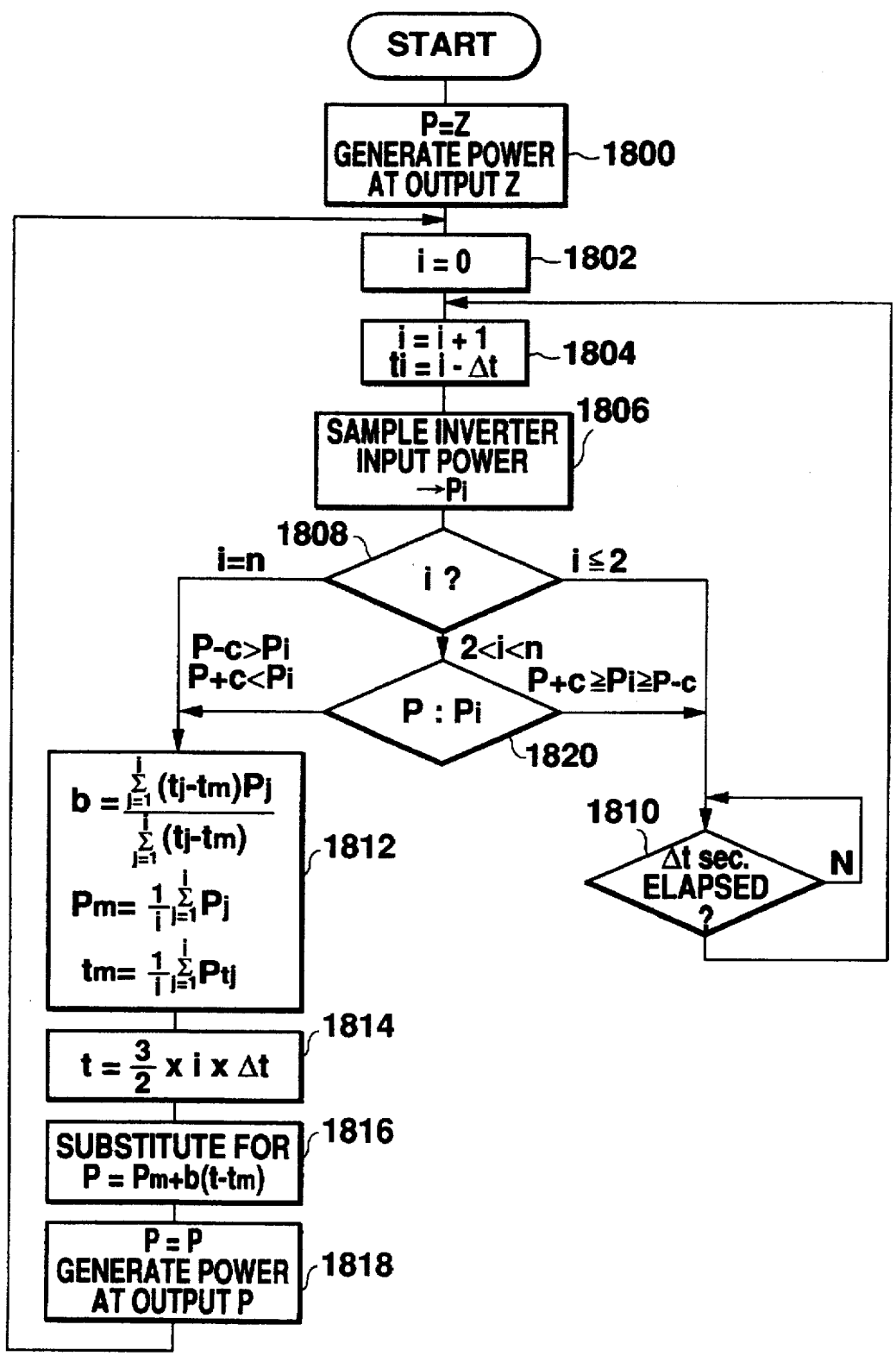

Referring to FIG. 23 there is depicted the eighteenth embodiment of the present invention comprising a combination of the first embodiment and the twelfth embodiment. As shown, the controller 28 controls the generated power with a predetermined value Z as its target power to be generated (1800). Afterwards the controller 28 resets the variable i to 0 (1802), and samples the instantaneous inverter input power $P_i$ (1806) for each of sampling periods $\Delta t$ (1810). Every execution of the sampling, the controller 28 increments the variable i indicating the number of times of sampling and increases the variable $t_i$ by $\Delta t$ (1804). When the number of times i of sampling reaches a given number of times n (1808), the controller 28 executes steps 1812 to 1818 identical with the steps 110 to 116 in the first embodiment, and then returns to the step 1802. It is to be particularly noted that "5" in the expression (1) associated with the first embodiment is replaced by "n" since the upper limit of the number of times i of sampling is set to n, and that the expression (2) is transformed into $t=(3/2) \times i \times \Delta t$ by utilizing the fact that the interval of the timing $t_i$ is constant $(=\Delta t)$.

In the case where the sampled value Pi of the instantaneous inverter input power has changed to a significant degree compared with the current target power (designated at P in the diagram) before reaching n after the number of times of sampling has become 2 or more, in other words, where $P-c>P_i$ or $P+c <P_i$ has been established (1820; c represents a constant), the controller 28 executes the steps 1812 to 1818 in accordance with i pieces of data sampled by that time, and returns to the step 1802. That is, the decision of the line L and the estimate of the expected inverter input power are intentionally carried out before the execution of n-times sampling. This will allow for any abrupt change in the output power of the motor 10 with accuracy obtained in the first embodiment.

f) Supplement

Although in the first and second embodiments, etc., among the above embodiments the line L is used to approximate the instantaneous inverter input power $P_i$ for setting the target power to be generated, the line L may be a curved line, not a straight line.

Although in the second embodiment the approximation line (curved line) L is determined by two timings during a single average period, use may be made of even more timings for that purpose. For instance the following procedure is also naturally available. Several timings are arbitrarily set in the respective vicinities of the two timings so that the instantaneous inverter input power $P_i$ is sampled at the individual timings thus set. Thereafter the sampling results are averaged for each of the two timings, and two averages obtained are used to determine the approximation line (it may be a straight line or a curved line) L. This will smooth instantaneous variations of the instantaneous inverter input power $P_i$, contributing to a stabler control.

There may exist three methods in order to find the instantaneous inverter input power $P_i$. First is a method using multiplication of a battery voltage $V_B$ and an inverter input current $I_{INV}$; second is a method using a multiplication of a motor voltage $V_M$ and a motor current $I_M$; and third is a method using multiplication of a reference torque $T_{ref}$ and the number of rotations N of the motor 10. It will be understood that in the latter two methods the result of the multiplication must be divided by the efficiency of the inverter 20.

Although the accelerator angle $\theta_A$ is used in some of the above embodiments, the accelerator angle $\theta_A$ may be substituted by the reference torque $T_{ref}$. It will be appreciated that use of the externally applied accelerator angle $\theta_A$ would present an improved responsivity compared with the case using the reference torque $T_{ref}$ obtained after the calculation based on the accelerator angle $\theta_A$.

Additionally although in the above embodiments the number of rotations N of the motor 10 is treated as the vehicle velocity v, transmission ratio as well as the number of motor rotations N must be taken into consideration for the vehicles equipped with transmission gears. It is also possible to execute a control focusing on the battery voltage $V_B$ instead of the control based on the battery current $I_B$ or the SOC.

Furthermore although in the first and second embodiments the approximation line L for a certain averaging period is used to determine the target power to be generated for the next averaging period, this approximation line L may be used to determine the target powers for further subsequent averaging periods.

While the present invention has been described in connection with the preferred embodiments, it is not intended to limit the scope of the invention to the particular forms set forth, but on the contrary, it is intended to cover such alternatives, modifications and equivalents as may be included within the spirit and scope of the invention as defined by the appended claims.

What is claimed is:

1. A method of controlling a generated power to be executed in a series hybrid vehicle, said series hybrid vehicle including an engine, a generator, a battery and a motor, the generator being driven by the engine, the motor being driven by said generated power of the generator and a discharged power of the battery, the battery being charged by said generated power;

said method comprising:

a first step of controlling, for each of successive periods, said generated power in accordance with a target power to be generated;

a second step of detecting, while controlling the generated power, a plurality of times in a single period, a prediction base quantity indicating both an instantaneous motor output of said motor and a direction of change of the instantaneous motor output; and a third step of determining, on a basis of said prediction base quantity, a target power to be generated in a coming period.

2. A method according to claim 1, wherein said instantaneous motor output comprises detecting conditions selected from a group of conditions consisting of:

a) a combination of a current flowing through the motor and a voltage applied to the motor;

b) a combination of a discharged current of the battery and a voltage of the battery; and c) a combination of an output torque of the motor and a number of rotations of the motor.

3. A method according to claim 1, wherein said prediction base quantity is an approximation function approximating variations in said instantaneous motor output, said third step including:

a step of estimating an expectation of an average output of the motor in said coming period, using the approximation function determined with respect to a period which has already elapsed; and a step of determining, on the basis of said expectation, the target power to be generated in said coming period.

4. A method according to claim 3, wherein said approximation function is a linear function.

5. A method according to claim 3, further comprising a step of determining said approximation function by approximating, using a least-squares approximation, a relationship between a plurality of points of time lying within the period which has already elapsed and the instantaneous motor output at the plurality of points of time.

6. A method according to claim 3, further comprising a step of determining said approximation function as a function joining the instantaneous motor output of the motor at each of the plurality of points of time lying within the period which has already elapsed.

7. A method according to claim 6, wherein the plurality of points, used in the step of determining said approximation function as a function joining the instantaneous motor output of the motor, comprise points at a start timing and an end timing of the period which has already elapsed.

8. A method according to claim 3, wherein the step of estimating said expectation substitutes for said approximation function a point of time lying in a middle of said coming period.

9. A method according to claim 1, further comprising the step of designating said prediction base quantity as a first index value indicating a state of positive/negative acceleration of the motor at the most recent point of time; and said third step including:

a step of averaging instantaneous motor outputs for each period to detect an average output of the motor in that period; and a step of setting, as the target power in said coming period, the quantity obtained by modifying, in accordance with said first index value, the average output of the motor in a period which has already elapsed.

10. A method according to claim 9, wherein the steps of designating said prediction base quantity as said first index value uses a value selected from a group of values consisting of:

a) an instantaneous motor output of the motor at the most recent point of time;

b) a number of rotations of the motor at the most recent point of time;

c) a velocity of the series hybrid vehicle at the most recent point of time;

d) a torque required for the motor at the most recent point of time; and e) an amount of depression of an accelerator pedal at the most recent point of time as said first index value.

11. A method according to claim 9, further comprising:

a step of classifying, previous to said modification, into any one of a plurality of output zones, the average output of the motor in the period which has already elapsed on the basis of its value;

a step of classifying, previous to said modification, into any one of a plurality of positive/negative acceleration zones, the state of positive/negative acceleration at the most recent point of time on the basis of its first index value; and a step of determining, previous to said modification, contents of said modification in accordance with a combination of the output zone into which said average output has been classified and the positive/negative acceleration zone into which said state of positive/negative acceleration has been classified.

12. A method according to claim 11, further comprising the steps of:

modifying said target power to be generated into a larger value than before modification in the case where the output zone into which said average output has been classified is an output zone indicating a small output and the positive/negative acceleration zone into which said state of positive/negative acceleration has been classified is a positive/negative acceleration zone indicating a high positive acceleration, and modifying said target power to be generated into a smaller value than before modification in the case where the output zone into which said average output has been classified is an output zone indicating a large output and the positive/negative acceleration zone into which said state of positive/negative acceleration has been classified is an positive/negative acceleration zone indicating a low positive acceleration.

13. A method according to claim 12, wherein the step of modifying said target power to be generated uses a constant predetermined by a ratio relative to a permitted maximum generated power of the generator.

14. A method according to claim 9, further comprising:

a step of detecting, previous to modification of said target power to be generated, a second index value indicating a state of average positive/negative acceleration of the motor in said period which has already elapsed;

a step of detecting, previous to modification of said target power to be generated, said first index value; and a step of modifying said target power to be generated in accordance with an amount of variation of said second index value with respect to said first index value.

15. A method according to claim 14, wherein the step of detecting said second index value detects a value selected from a group of values consisting of:

a) an average output of the motor in the period which has already elapsed;

b) an average number of rotations of the motor in the period which has ready elapsed;

c) an average velocity of the series hybrid vehicle in the period which has already elapsed;

d) an average torque required for the motor in the period which has already elapsed; and e) an average amount of depressing an accelerator pedal in the period which has already elapsed and uses said detected value as said second value.

16. A method according to claim 1, further comprising the step of:

using said prediction base quantity as a first index value indicating the state of positive/negative acceleration of the motor at the most recent point of time; and said third step including;

a step of detecting that the first index value has changed to a predetermined degree or more, on the basis of a second index value indicating the state of positive/negative acceleration of the motor during a preceding predetermined period of time;

a step of, when the first index value has changed to a predetermined degree or more, compulsorily interrupting the period which is just about to elapse and compulsorily starting a new period;

a step of averaging the instantaneous motor outputs of the motor for each period to detect the average output of said motor in that period; and a step of setting, at the time when the new period is started, as the target power to be generated in that new period the average output of the motor in the period which has already elapsed.

17. A method according to claim 16, wherein the second step of detecting said prediction base quantity, which is used as the first index value, detects a value selected from a group of values consisting of:

a) an instantaneous motor output of the motor at the most recent point of time or its moving average;

b) a number of rotation of the motor at the most recent point of time or its moving average;

c) a velocity of the series hybrid vehicle at the most recent point of time or its moving average;

d) a torque required for the motor at the most recent point of time or its moving average and e) an amount of depressing an accelerator pedal at the most recent point of time or its moving average;

the second index value is any one selected from a group consisting of:

f) an average output of the motor in the period which has already elapsed;

g) an average number of rotations of the motor in the period which has already elapsed;

h) an average velocity of the series hybrid vehicle in the period which has already elapsed;

i) an average torque required for the motor in the period which has already elapsed; and j) an average amount of depressing the accelerator pedal in the period which has already elapsed.

18. A method according to claim 16, further comprising:

a step of averaging the first index values for each period to determine the second index value in the next period.

19. A method according to claim 1, further comprising a step of:

designating said prediction base quantity as a third index value indicating the state of charge/discharge of said battery at the most recent point of time; and said third step including:

a step of detecting that the third index value has changed to a predetermined degree or more, on the basis of a fourth index value indicating the average state of charge/discharge of the battery during the preceding predetermined period of time;

a step, when said third index value has changed to said predetermined value or more, for compulsorily interrupting the period which is just about to elapse and for compulsorily starting a new period;

a step of averaging the instantaneous outputs of the motor for each period to detect the average output of the motor; and a step, at the point of time when the new period has been started, for setting as the target power in that new period, the average output of the motor in the period which has already elapsed.

20. A method according to claim 19, wherein the step of designating said prediction base quantity as said third index value uses a value selected from a group of values consisting of:
   a) a discharged current of the battery at the most recent point of time or its moving average;
   b) an accumulated value of the discharged current of the battery in the period which is just about to elapse; and
   c) a state of charge of the battery at the most recent point of time;

said fourth index value comprises one of:
   d) 0; or
   e) a state of charge of the battery at the earliest point of time after the end of the period which has already elapsed.

* * * * *